(12) United States Patent
Nakagawa et al.

(10) Patent No.: US 7,424,572 B2
(45) Date of Patent: Sep. 9, 2008

(54) STORAGE DEVICE SYSTEM INTERFACING OPEN-SYSTEM HOST COMPUTER INPUT/OUTPUT INTERFACES

(75) Inventors: Yoshihito Nakagawa, Ooi (JP); Isamu Kurokawa, Odawaram (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 10/975,817

(22) Filed: Oct. 29, 2004

(65) Prior Publication Data
US 2006/0053266 A1 Mar. 9, 2006

(30) Foreign Application Priority Data
Sep. 7, 2004 (JP) .............................. 2004-259917

(51) Int. Cl.
*G06F 12/00* (2006.01)
(52) U.S. Cl. ...................................... 711/112; 707/102
(58) Field of Classification Search ................. 711/111, 711/112, 114, 154; 707/102, 200
See application file for complete search history.

(56) References Cited

U.S. PATENT DOCUMENTS

| | | | |
|---|---|---|---|
| 5,920,893 A | 7/1999 | Nakayama et al. | |
| 6,173,360 B1 * | 1/2001 | Beardsley et al. | 711/111 |
| 6,304,940 B1 * | 10/2001 | Beardsley | 711/112 |
| 6,782,401 B2 * | 8/2004 | Winokur | 707/201 |
| 6,842,835 B1 * | 1/2005 | Fujimoto et al. | 711/162 |
| 2002/0178336 A1 * | 11/2002 | Fujimoto et al. | 711/165 |
| 2004/0123026 A1 | 6/2004 | Kaneko | |

FOREIGN PATENT DOCUMENTS

| | | |
|---|---|---|
| EP | 1085414 | 3/2001 |
| EP | 1357476 | 10/2003 |
| JP | 9-325905 | 12/1997 |

OTHER PUBLICATIONS

Sutton, Tim et al., "Fibre Channel: The Digital Highway Made Practical" White Pages Seagate Technology, Oct. 22, 1994.*
American National Standard for Information Technology, "Fibre Channel Arbitration Loop (FC-AL) Rev 4.5", Jun. 1, 1995.*

* cited by examiner

*Primary Examiner*—Pierre-Michel Bataille
(74) *Attorney, Agent, or Firm*—Antonelli, Terry, Stout & Kraus, LLP.

(57) ABSTRACT

A storage device system in which migration of data from an existing storage device to a higher-standard storage device is unnecessary, and in which discarding of existing storage devices by the user can be prevented. A CHF 61 receives a Read Capacity command from a new-type storage device 25 (S101). Using LDEV, LUN and other information tables, an LUN 87 is converted into a mapped LDEV (S102). A check is performed to determine whether the LDEV emulation type is read-only, write-only, or read/write (S103). If none of these, a check is performed to determine whether the emulation type is newly created (S104). If newly created, the size of all storage areas of the LDEV are set as the Max LBA in a response to the new-type storage device 25 (S105). If the result of S103 is YES, the size of the user area in the LDEV is set as the Max LBA in a response to the new-type storage device 25 (S106). If not newly created, processing proceeds to the processing of S106.

10 Claims, 26 Drawing Sheets

VDEV INFORMATION

| | |
|---|---|
| VDEV#[0] | VDEV#0 |
| VDEV CAPACITY | VDEV SIZE |
| LDEV# | LDEV# TO WHICH VDEV IS MAPPED |
| PORT#[0] | CHF PORT# CONNECTED TO EXTERNAL STORAGE |
| PORT#[1] | CHF PORT# CONNECTED TO EXTERNAL STORAGE |
| ... | |
| PORT#[n-1] | CHF PORT# CONNECTED TO EXTERNAL STORAGE |
| PORT#[n] | CHF PORT# CONNECTED TO EXTERNAL STORAGE |
| VENDOR NAME | VENDOR NAME OF EXTERNAL STORAGE |
| DEVICE TYPE | NAME OF EXTERNAL STORAGE |
| LUN | EXTERNAL STORAGE LUN |
| EXTERNAL LUN EMULATION | EMULATION TYPE OF EXTERNAL STORAGE LUN |
| WWN[0] | WWN OF EXTERNAL STORAGE LUN |
| WWN[1] | WWN OF EXTERNAL STORAGE LUN |
| ... | |
| WWN[n1] | WWN OF EXTERNAL STORAGE LUN |
| WWN[n] | WWN OF EXTERNAL STORAGE LUN |
| EXTERNAL LUN CAPACITY "LBA" | VALUE OBTAINED BY READ CAP TO LUN OF EXTERNAL STORAGE |
| VDEV#[1] | VDEV#1 |
| ... | |
| EXTERNAL LUN CAPACITY "LBA" | VALUE OBTAINED BY READ CAP TO LUN OF EXTERNAL STORAGE |
| ... | |
| VDEV#[n-1] | VDEV#n1 |
| ... | |
| EXTERNAL LUN CAPACITY "LBA" | VALUE OBTAINED BY READ CAP TO LUN OF EXTERNAL STORAGE |
| VDEV#[n] | VDEV#n |
| ... | |
| EXTERNAL LUN CAPACITY "LBA" | VALUE OBTAINED BY READ CAP TO LUN OF EXTERNAL STORAGE |

FIG. 7

LDEV INFORMATION

| | |
|---|---|
| VDEV#0 | VDEV#0 |
| VDEV CAPACITY | VDEV SIZE |
| LDEV# | LDEV# TO WHICH VDEV IS MAPPED |
| EMULATION | LDEV EMULATION TYPE |
| VDEV#1 | VDEV#1 |
| ... | |
| EMULATION | LDEV EMULATION TYPE |
| ... | |
| VDEV#[n-1] | VDEV#n-1 |
| ... | |
| EMULATION | LDEV EMULATION TYPE |
| VDEV#[n] | VDEV#n |
| ... | |
| EMULATION | LDEV EMULATION TYPE |

FIG. 8

LUN INFORMATION

| | |
|---|---|
| PORT#0 | PORT#0 |
| LUN0 | LUN |
| LDEV | LUN LDEV# |
| HOST MODE | HOST MODE |
| LUN0 | LUN |
| LDEV | LUN LDEV# |
| HOST MODE | HOST MODE |
| ... | |
| LUNn-1 | LUN |
| LDEV | LUN LDEV# |
| HOST MODE | HOST MODE |
| LUNn | LUN |
| LDEV | LUN LDEV# |
| HOST MODE | HOST MODE |
| PORT#1 | PORT#1 |
| LUN0 | LUN |
| LDEV | LUN LDEV# |
| HOST MODE | HOST MODE |
| ... | |
| PORT#n-1 | PORT#n-1 |
| LUN0 | LUN |
| LDEV | LUN LDEV# |
| HOST MODE | HOST MODE |
| ... | |
| PORT#n | PORT#n |
| LUN0 | LUN |
| LDEV | LUN LDEV# |
| HOST MODE | HOST MODE |
| ... | |

FIG. 9

(a)
(1) CASE OF MF
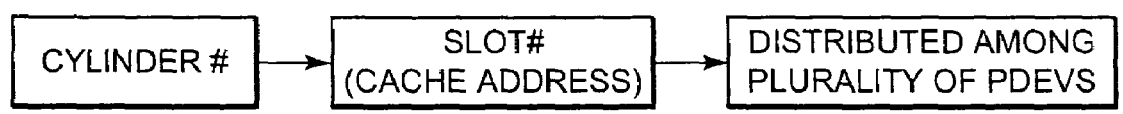
(b)
(2) CASE OF OPEN SYSTEM
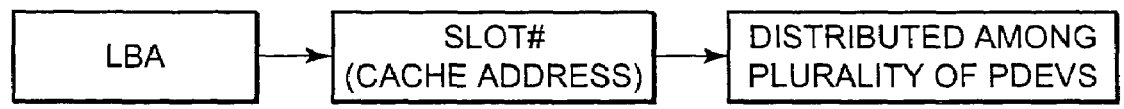
FIG. 11

(1) I/O FROM MF

SLOT#=CLY* 15;
1SLOT=116SBK=58KBYTE; (SBK=512KBYTE)

(a)

| CYLINDER | SLOT# |
|---|---|
| 0 | 0 |
| 1 | 15 |
| 2 | 30 |
|  |  |
| n | CLY* 15 |

(2) CASE OF OPEN SYSTEM

SLOT#=LBA / 116;
SBK#=LBA% 116;
1SLOT=116SBK=58KBYTE; (SBK=512KBYTE)

(b)

| LBA | SLOT# / SBK# |
|---|---|
| 0 | 0 / 0 |
| 1 | 0 / 1 |
| 2 | 0 / 2 |
|  |  |
| 74 | 1 / 0 |
|  |  |
| 6cc | 15 |
|  |  |
| n | LBA / 116 |

FIG. 12

(1) I/O FROM MF

SLOT#=CLY* 15;
1SLOT=116SBK=58KBYTE; (SBK=512KBYTE)

(a)

| CYLINDER | SLOT# |
|----------|-------|
| 0 | 0 |
| 1 | 15 |
| 2 | 30 |
| | |
| n | CLY* 15 |

(2) I/O FROM CACHE TO OLD-TYPE STORAGE DEVICE 23

SLOT#=LBA / 116;
SBK#=LBA% 116;
1SLOT=116SBK=58KBYTE; (SBK=512KBYTE)

(b)

| SLOT# / SBK# | LBA |
|--------------|-----|
| 0 / 0 | 0 |
| 0 / 1 | 1 |
| 0 / 2 | 2 |
| 1 / 0 | 74 |
| 15 | 6cc |
| LBA / 116 | n |

FIG. 13

EXTERNAL DEVICE LIST 220

| DEVICE NAME | S/N | LU# | EMULATION TYPE | CAPACITY |
|---|---|---|---|---|
| OLD-TYPE STORAGE DEVICE | 1111111 | 0 | 3390-3 | 123456789 |
| OLD-TYPE STORAGE DEVICE | 1111111 | 1 | 3390-3 | 222222222 |
| OLD-TYPE STORAGE DEVICE | 1111111 | 2 | 3390-3 | 333333 |
| OLD-TYPE STORAGE DEVICE | 1111111 | X | 3390-X | 666666666 |

FIG. 15

BACKUP VIA OPEN-SYSTEM HOST
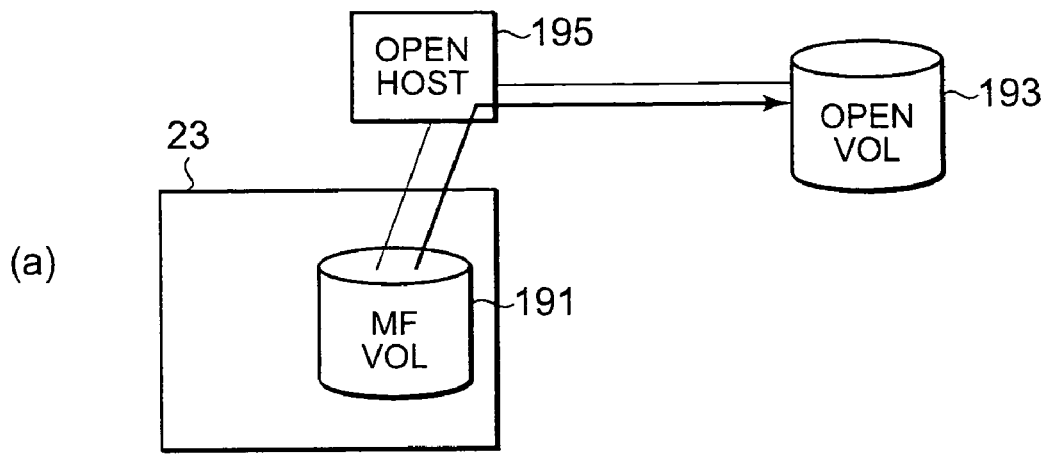
BACKUP WITHOUT OPEN-SYSTEM HOST
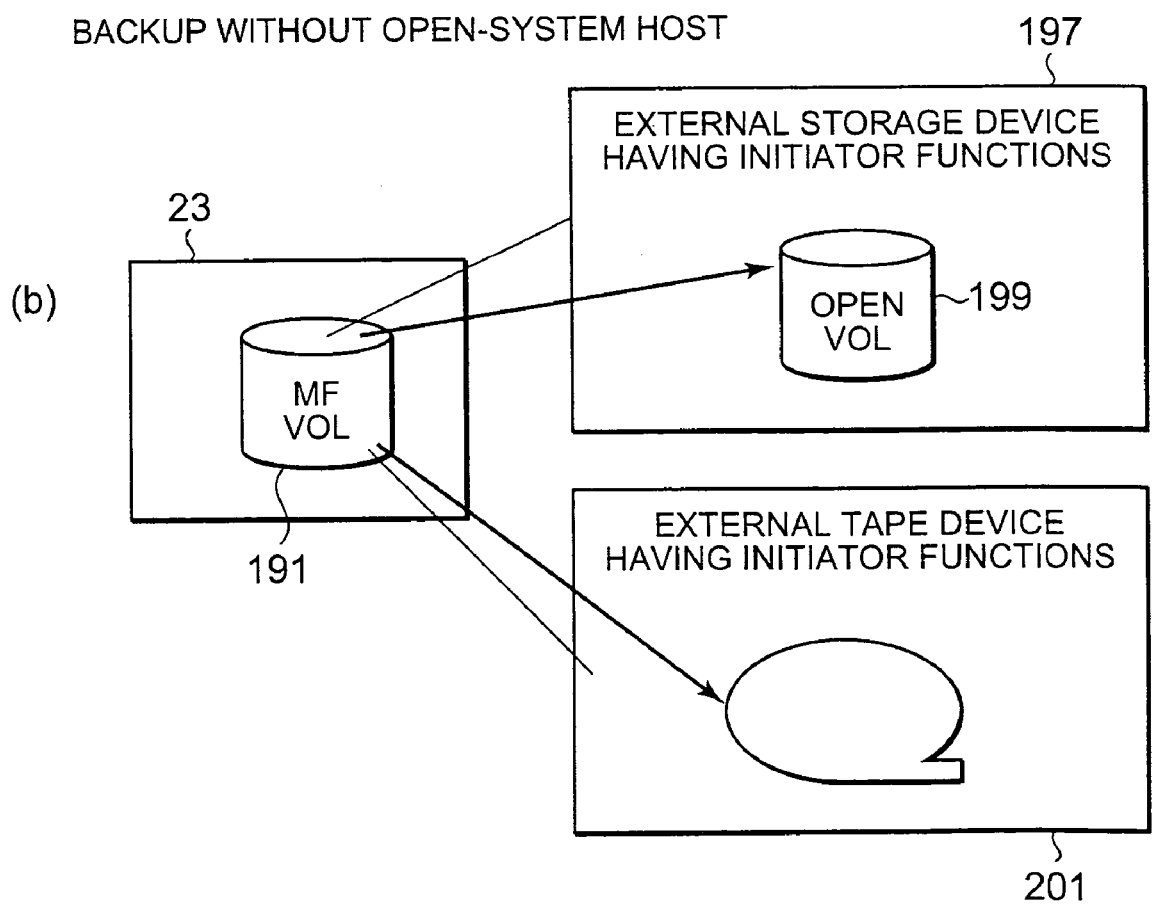
FIG. 25

STORAGE DEVICE SYSTEM INTERFACING OPEN-SYSTEM HOST COMPUTER INPUT/OUTPUT INTERFACES

CROSS-REFERENCE TO PRIOR APPLICATION

This application related to and claims priority from Japanese Patent Application No. 2004-259917, filed on Sep. 7, 2004, the entire disclosure of which is incorporated herein by reference.

BACKGROUND OF THE INVENTION

1. Field of the Invention

This invention relates to a storage device system, which has a storage device of a first standard having a first mainframe volume, and a storage device of a second standard more advanced than the above first standard, having a second mainframe volume and connected via the interface of an open system to the above first-standard storage device.

2. Description of the Related Art

In the prior art, storage control devices have been proposed which enable sharing in each storage media among host computers (HCPs) having various different host computer input/output interfaces. In such a storage control device, when there is a write request from an HCP, the control processor references a host computer interface management table, and if the HCP data format is an open-system FBA format, writes the write data without modification to a cache slot in cache memory, but if the format is a mainframe CKD format, performs conversion into FBA format and writes the data. When there is a read request from an HCP, the control processor references the host computer interface management table, and if the HCP data format is FBA, transfers the data read from the cache slot to the HCP without modification, but if the format is CKD, performs conversion into FBA and transfers the data. Another control processor searches for write data in cache memory and performs writing to a drive (see for example Japanese Patent Laid-open No. 9-325905).

FIG. 1 is a block diagram showing in summary a storage system of the prior art.

In the storage system shown in FIG. 1, when the mainframe host computer (MF host) 1 transmits a read/write command to the storage device 3 via a channel interface (channel I/F) and communication port, a channel adapter (CHA) 5 in the storage device 3 receives the read/write command. As a result, read/write processing is executed in the storage device 3. In the storage device 3, mainframe data (MF data) is stored in a logical device (logical volume) (LDEV B) 7. The LDEV B7 is created on the physical devices (physical volumes) (PDEV B) $9_1$, $9_2$, $9_3$, $9_4$, and the LDEV B7 is mapped to a RAID (Redundant Array of Independent Inexpensive Disks) configuration of the plurality of PDEV B devices $9_1$, $9_2$, $9_3$, $9_4$.

However, when a user newly introduces a storage device based on a high standard and comprising superior functions such as, for example, data protection functions, upon using this high-standard storage device, all the data stored in the storage device 3 must be transferred to the above high-standard storage device (data migration). However, there is the problem that this data migration task entails a large amount of labor. Further, in addition to the above task, after data has been migrated the storage device 3 must be disconnected from all connected hosts, and these hosts must be newly connected to the above high-standard storage device. Moreover, situations may arise in which, even though the storage device 3 can still be used effectively by some users, the storage device 3 is discarded simply because it is an older model, so that information processing resources are wasted.

SUMMARY OF THE INVENTION

An object of this invention is to provide a storage device system in which, even when the user introduces a storage device conforming to a standard higher than an existing storage device, there is no need to perform data migration from the existing storage device to the high-standard storage device, and in which, moreover, discarding of existing storage devices by the user can be prevented.

In a storage device system comprising an existing storage device and a storage device conforming to a higher standard, an open-system host can access all storage areas of the mainframe volume of the existing storage device via a mainframe volume of the high-standard storage device.

A storage device system according to a first perspective of the invention comprises a storage device of a first standard, having a first mainframe volume, and a storage device of a second standard higher than the above first standard, having a second mainframe volume, and connected via an open-system interface to the above first-standard storage device; moreover, the above first-standard storage device has a mapping portion which maps the above first volume to the above second volume such that the mainframe host connected to the above second-standard storage device can access all the data stored in the above first volume via the above second volume. Here, the second standard, which is higher than the first standard, is, for example, a standard comprising superior data protection functions (and similarly also below).

In a preferred aspect of this first perspective of the invention, the attributes on the above second-standard storage device side of the above open-system interface are set by the initiator, and the attributes on the above first-standard storage device side are set by the target.

In a separate aspect from the above, the above first and second mainframe volumes are logical volumes, and the above mapping portion issues a Read Capacity Command, which is an open system command, to the above first-standard storage device, and acquires LUN information set on the above first-standard storage device side of the above open system interface to perform the above mapping.

Further, in a separate aspect from the above, at the time of the above mapping the above mapping portion sets, in the mainframe volume, the emulation type of the above second mainframe volume.

Further, in a separate aspect from the above, at the time of the above mapping the above second-standard storage device receives a CKD FORMAT command transmitted from the above mainframe host and performs data conversion of this command into the MF FORMAT of the above first-standard storage device, as well as issuing a READWRITE command, which is a SCSI command, to the above first-standard storage device.

A storage device system according to a second perspective of the invention comprises a storage device of a first standard, having a first mainframe volume, and a storage device of a second standard higher than the above first standard, having a second mainframe volume, and connected via an open-system interface to the above first-standard storage device; moreover, the above first-standard storage device has a mapping portion which maps the above first volume to the above second volume such that the mainframe host connected to the above second-standard storage device can access all the data stored in the above first volume via the above second volume, and a virtual volume setting portion which sets a virtual volume of the above first volume which can be identified as an open-system volume in which all storage areas of the above first volume can be accessed, via the above second volume, by an open-system host connected to the above second-standard storage device.

In a preferred aspect of the second perspective of this invention, the above first and second volumes are logical volumes, and the above second-standard storage device has a VDEV information table having information relating to the virtual volume of the above first logical volume, an LDEV information table having LDEV information referenced by the mainframe host regarding the virtual volume for which the above mapping is performed, and a LUN information table having information relating, at least, to the above LDEV.

Further, in a separate aspect from the above, the above first- and second-standard storage devices perform address conversion from cylinder numbers to block addresses in a cache when the mainframe host accesses the above first-standard storage device via the above second-standard storage device.

Further, in a separate aspect from the above, the above first- and second-standard storage devices perform address conversion from LBAs to block addresses in a cache when an open-system host accesses the above first-standard storage device via the above second-standard storage device.

A storage device system according to a third perspective of the invention comprises a storage device of a first standard, having a first mainframe volume, and a storage device of a second standard higher than the above first standard, having a second mainframe volume, and connected via an open-system interface to the above first-standard storage device; moreover, the above first-standard storage device has a mapping portion which maps the above first volume to the above second volume such that the mainframe host connected to the above second-standard storage device can access all the data stored in the above first volume via the above second volume, and a virtual volume setting portion which sets a virtual volume of the above first volume which can be identified as an open-system volume in which user data storage areas of the above first volume can be accessed, via the above second volume, by an open-system host connected to the above second-standard storage device; and, when it is judged that the host accessing the above second-standard storage device is an open-system host, the above first-standard storage device performs processing so as to expand the above virtual volume to the same size as the above first volume.

In a preferred aspect of the third perspective of the invention, when in the processing to expand the above virtual volume the above second-standard storage device is set as the initiator and moreover the above first-standard storage device is set as the target, the above processing is executed in a host mode in which special operations are performed appropriate to the type of host connected to the above second-standard storage device.

BRIEF DESCRIPTION OF THE DRAWINGS

FIG. 7 is an explanatory drawing showing a VBEV information table comprised by a new-type storage device;

FIG. 8 is an explanatory drawing showing a LDEV information table comprised by a new-type storage device;

FIG. 9 is an explanatory drawing showing a LUN information table comprised by a new-type storage device;

FIG. 11 is an explanatory drawing showing an example of address conversion performed in the new-type storage device and in the old-type storage device when an MF host or an open-system host accesses an old-type storage device via a new-type storage device;

FIG. 12 is an explanatory drawing showing one example of a conversion method used in address conversion in the old-type storage device shown in FIG. 11;

FIG. 13 is an explanatory drawing showing the conversion method used in address conversion performed in the new-type storage device when the MF host or an open-system host accesses the old-type storage device via the new-type storage device;

FIG. 15 is an explanatory drawing showing an example of a screen image displayed by the display portion of an SVP (service processor) connected to the new-type storage device of FIG. 3;

FIG. 25 is a block diagram showing an example of a backup method for an MF VOL comprised by an old-type storage device comprised by the storage device system of an aspect of the invention; and, FIG. 26 is a block diagram showing another example of a backup method for an MF VOL comprised by an old-type storage device comprised by the storage device system of an aspect of the invention.

DESCRIPTION OF THE PREFERRED EMBODIMENTS

Below, aspects of this invention are explained in detail using the drawings.

Figure 1:
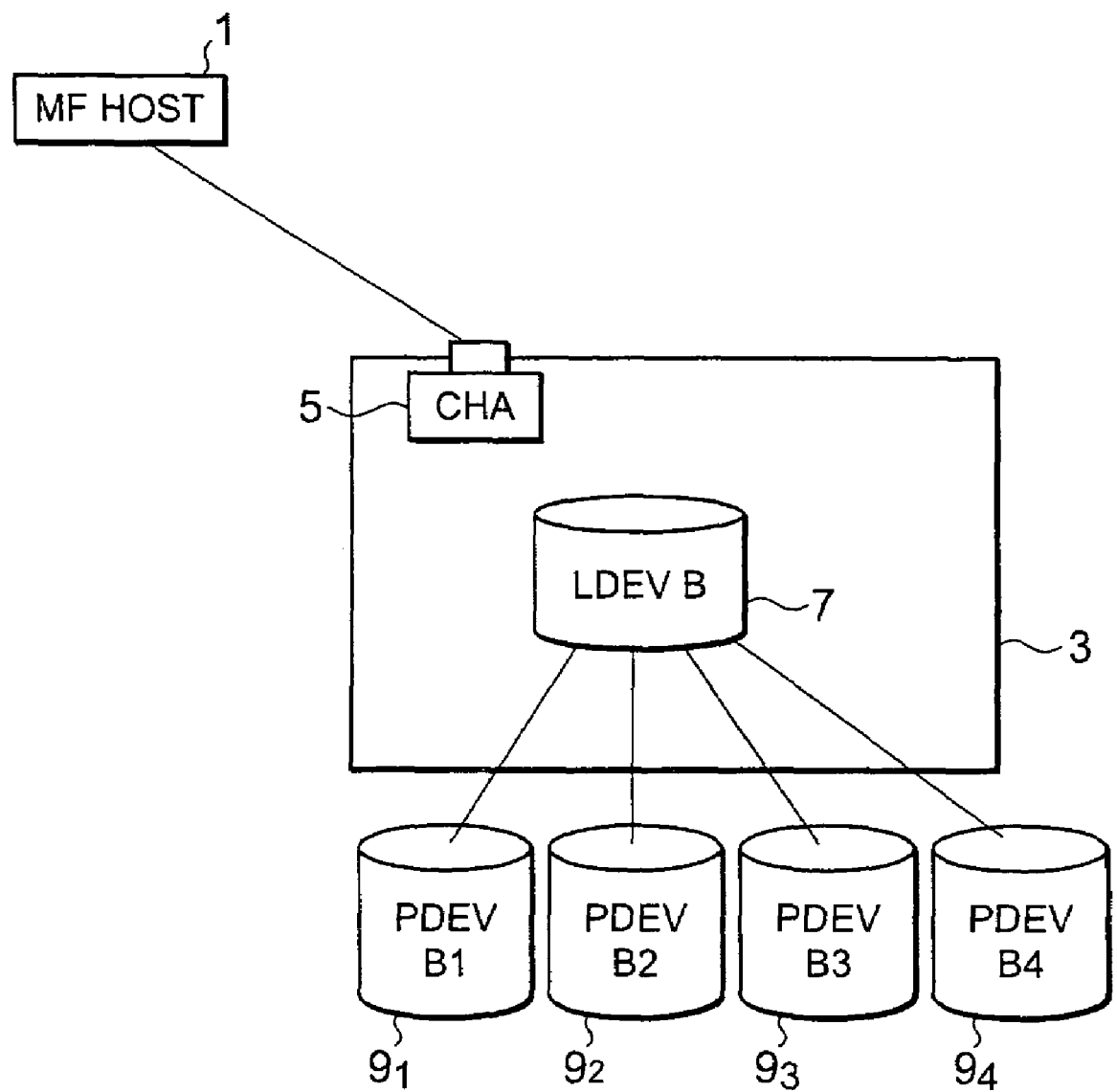
FIG. 1 is a block diagram showing in summary the configuration of a conventional storage device system.
Figure 2:
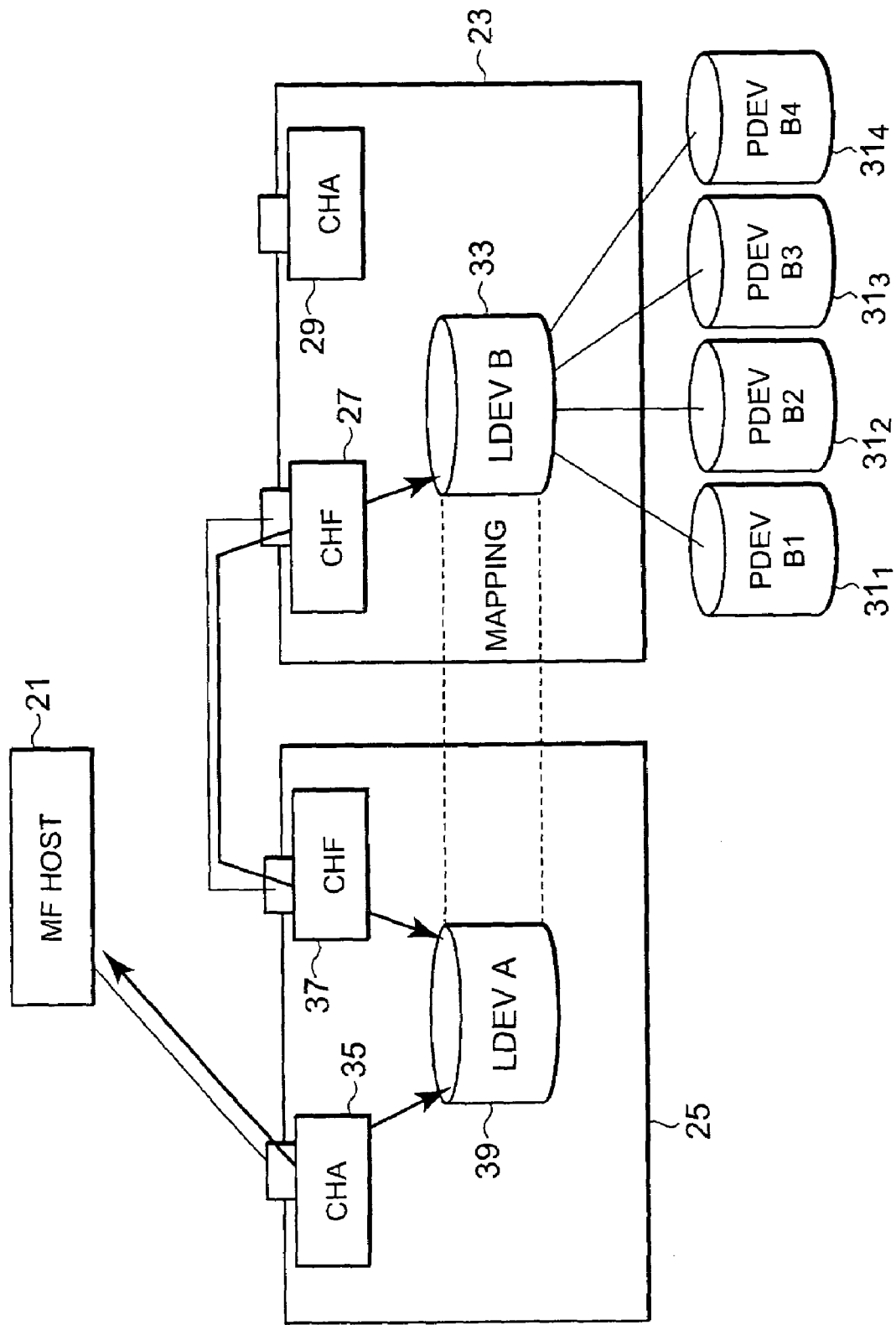
FIG. 2 is a block diagram showing in summary the configuration of a storage device system of one aspect of the invention.

FIG. 2 is a block diagram showing in summary the configuration of a storage device system of one aspect of the invention.

The above storage device system enables the mainframe data (MF data) of an old-type storage device to be taken over without modification and accessed via a new-type storage device, and as shown in FIG. 2, comprises the MF host 21, old-type storage device 23, and new-type storage device 25. The old-type storage device 23 comprises a CHA 27 having an ESCON (a registered trademark) FICON (a registered trademark) port, which is one type of channel interface, a CHF (Channel Adapter for Fiber) 29 having a fiber port, and an LDEV B33 to which a plurality of PDEV Bs $31_1$, $31_2$, $31_3$, $31_4$ are mapped in a RAID configuration. On the other hand, the new-type storage device 25 comprises a CHA 35 having an ESCON/FICON port connected to the MF host 21, a CHF 37, which is an open-system interface, having a fiber port, and an LDEV A39, which is for example a virtual device (virtual volume) which virtualizes physical storage resources. Here, the new-type storage device 25 is superior to the old-type storage device with respect to, for example, data protection functions.

In the above storage system, the old-type storage device 23 and new-type storage device 25 are connected via the CHF 29 and CHF 37 (both open-system interfaces), and MF data used on the side of the old-type storage system 23 is mapped to the LDEV A39 on the side of the new-type storage system 25. When a CKD (Count Key Data) FORMAT command is transmitted from the MF host 21 to the LDEV A39 (of the new-type storage device 25), the CHA 27 receives the command and notifies the CHF 29. The CHF 29 performs data conversion of the above CKD FORMAT command into the MF format of the old-type storage device 23, and uses a SCSI (Small Computer System Interface) command to issue a READ/WRITE command to the old-type storage device 23.

In the above configuration, by accessing (the new-type storage device side of) LDEV A39 via CHA 27, the MF host 21 can access (LDEV B) MF data being used on the side of the old-type storage device 23.

By means of the above configuration, when functions supported by the old-type storage device 23 are supported by the new-type storage device 25, functions of the new-type storage device 25 can be adapted to the LDEV B33 of the old-type storage device 23, without the migration of data on the side of the old-type storage device 23 to the side of the new-type storage device 25.

Figure 3:
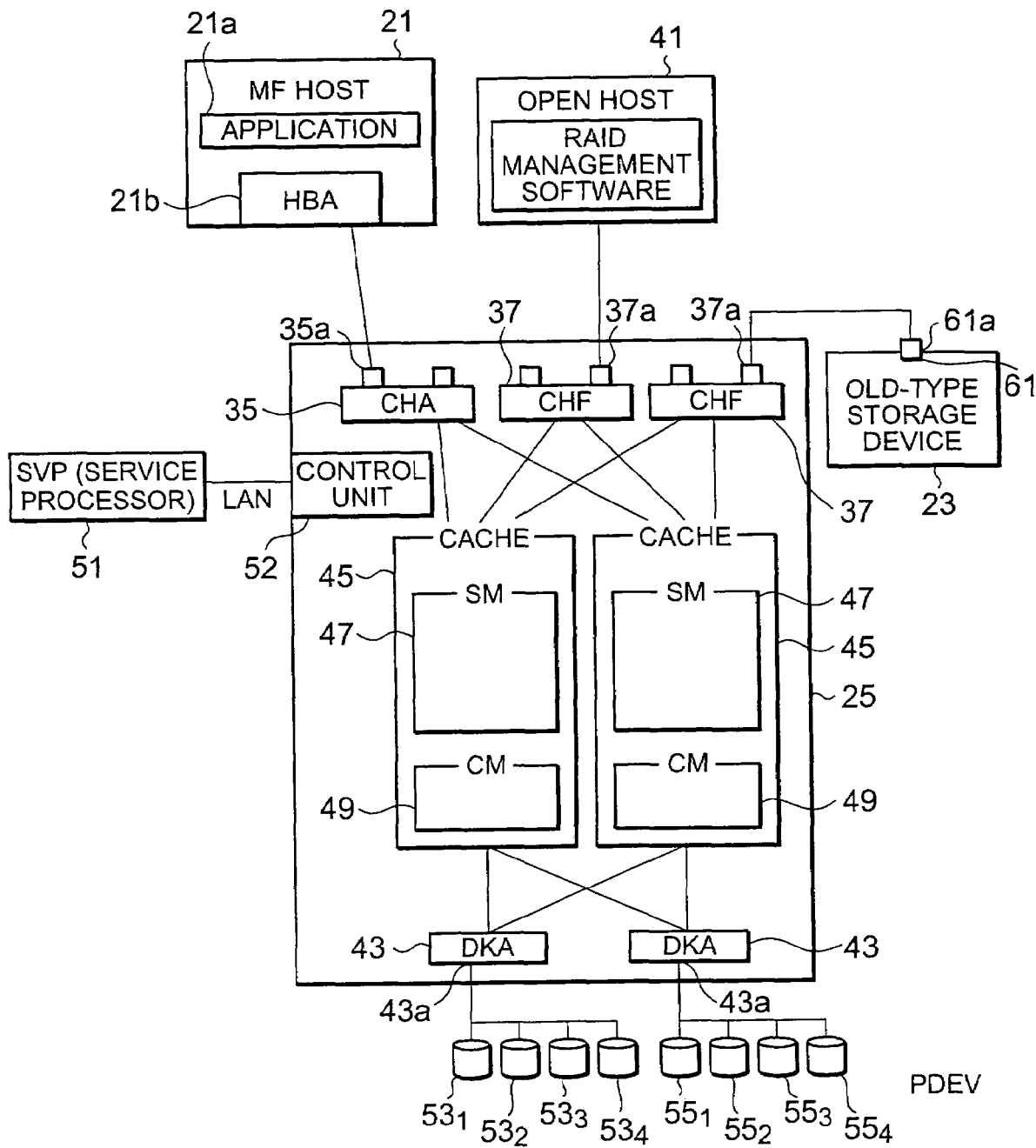
FIG. 3 is a block diagram showing the overall configuration of a new-type storage device comprised by the storage device system of FIG. 2.

FIG. 3 is a block diagram showing the overall configuration of a new-type storage device comprised by the storage device system of FIG. 2.

In FIG. 3, the MF host 21 is a computer apparatus comprising a CPU (Central Processing Unit), memory, and other information processing resources, and has information input means (not shown) such as for example keyboard switches, a pointing device, or a microphone, as well as information output means (not shown) such as for example a monitor display, speakers or similar. The MF host 21 has for example database software or another application program 21a which uses a storage area provided by the new-type storage device 25, and an adapter 21b to access the new-type storage device 25 via a communication network.

The MF host 21 is connected to the new-type storage device 25 via a mainframe communication network (one example is ESCON/FICON) (hereafter "communication network") Communication networks can be classified as appropriate into for example LANs (Local Area Networks), SANs (Storage Area Networks), the Internet, dedicated circuits, public circuits, and similar. Here, data communication via a LAN is performed according to, for example, the TCP/IP (Transmission Control Protocol/Internet Protocol) protocol. When the MF host 21 is connected to the new-type storage device 25 via a LAN, the MF host 21 requests data input and output in file units, specifying filenames. On the other hand, when the MF host 21 is connected to the new-type storage device via a SAN, the MF host 21 conforms to the fiber channel protocol to request data input and output in units of blocks, which are data management units for storage areas provided by a plurality of disk storage devices (disk drives). When the communication network is a LAN, the above adapter 21b is for example a LAN network card. When the communication network is a SAN, the above adapter 21b is for example a host bus adapter (HBA).

The configuration of the open-system host 41 is essentially the same as that of the MF host 21. The open-system host 41 is connected to the new-type storage device 25 via an open-system communication network (for example, a fiber channel network) (hereafter "communication network"). The open-system host 41 has for example RAID management software, which is database software or another application program which uses storage areas provided by the new-type storage device 25.

The new-type storage device 25 is for example configured as a disk array subsystem. However, the new-type storage device 25 is not limited thereto, and can be configured as an advanced-function intelligent fiber channel switch.

The new-type storage device 25 can be broadly divided into a controller portion and a storage device portion. The controller portion comprises, for example, a plurality of CHAs 35 (in FIG. 3, only one is shown), a plurality of CHFs 37 (in FIG. 3, only two are shown), and a plurality of disk adapters (DKAs) 43 (in FIG. 3, only two are shown). In addition to the above, the controller portion further comprises shared memory (SM) 47 and cache memory (CM) 49, installed on a plurality of cache boards (caches) 45 (in FIG. 3, only two are shown), and a service processor (SVP) 51, connected for example via a LAN.

Each CHA 35 comprises a communication port 35a to perform data communication with the MF host 21. In addition to the above, each CHA 35 is configured as a microcomputer system comprising CPU, memory and similar, which interprets and executes various commands received from the MF host 21. A network address (for example, an IP address or WWN (World Wide Name)) for identification is assigned to each CHA 35, and each can behave as a separate NAS (Network Attached Storage). When a plurality of MF hosts (21) exist, each CHA 35 can separately receive requests from each of the MF hosts (21).

Each of the DKAs 43 comprises a communication port 43a necessary for connection to the PDEVs ($53_1$ to $53_4$, $55_1$ to $55_4$) in order to exchange data with a plurality of PDEVs ($53_1$ to $53_4$, $55_1$ to $55_4$) in for example a RAID configuration. In addition to the above, each DKA 43 is configured as a microcomputer system comprising a CPU, memory and similar, and a CHA 35 writes data received from a MF host 21 to a prescribed address of a prescribed PDEV ($53_1$ to $53_4$, $55_1$ to $55_4$) based on a request (write instruction) from the MF host 21. Each DKA 43 also reads data from a prescribed address of a prescribed PDEV ($53_1$ to $53_4$, $55_1$ to $55_4$) based on a request (read instruction) from a MF host 21, and transmits the data via a CHA 35 to the MF host 21.

When each of the DKAs 43 performs data input/output with a PDEV ($53_1$ to $53_4$, $55_1$ to $55_4$), the DKA converts a logical address into a physical address. When the PDEVs ($53_1$ to $53_4$, $55_1$ to $55_4$) are managed in a RAID configuration, the DKAs 43 perform data access according to the RAID configuration.

The SVP 51 is connected to a control unit 52 which, as a management console, monitors and controls operation of the entire new-type storage device 25. The SVP 51 displays fault information in the new-type storage device 25 transmitted from the control unit 52 on the display portion, instructs close processing of the PDEVs ($53_1$ to $53_4$, $55_1$ to $55_4$) to the control unit 52, and similar.

The CM 49 temporarily stores data received by each CHA 35 from an MF host 21, and data read by each DKA 43 from PDEVs ($53_1$ to $53_4$, $55_1$ to $55_4$).

Control information and similar is stored in the SM 47. A work area is set in the SM 47, and in addition, for example, a mapping table and other tables are stored.

The storage device portion comprises a plurality of PDEVs ($53_1$ to $53_4$, $55_1$ to $55_4$). As the PDEVs ($53_1$ to $53_4$, $55_1$ to $55_4$), for example, hard disks, flexible disks, magnetic tapes, semiconductor memory units, optical discs, or other discs can be used.

The two CHFs 37 are both control packages for use in data communication between fiber channels and similar. The CHF 37 on the left side in FIG. 3 comprises a communication port, that is, a target port 37a, for data communication with the open-system host 41 via for example a fiber channel, which is an open-system communication network.

The CHF 37 on the right side in FIG. 3 comprises a communication port, that is, an initiator port 37a, for data communication with the old-type storage device 23 (target port 61a comprised by the CHF 61) via for example a fiber channel, which is an open-system communication network. The attempt by the CHF 37 on the right side in FIG. 3 to perform data communication with the old-type storage device 23 via the fiber channel is one feature of this aspect.

Figure 4:
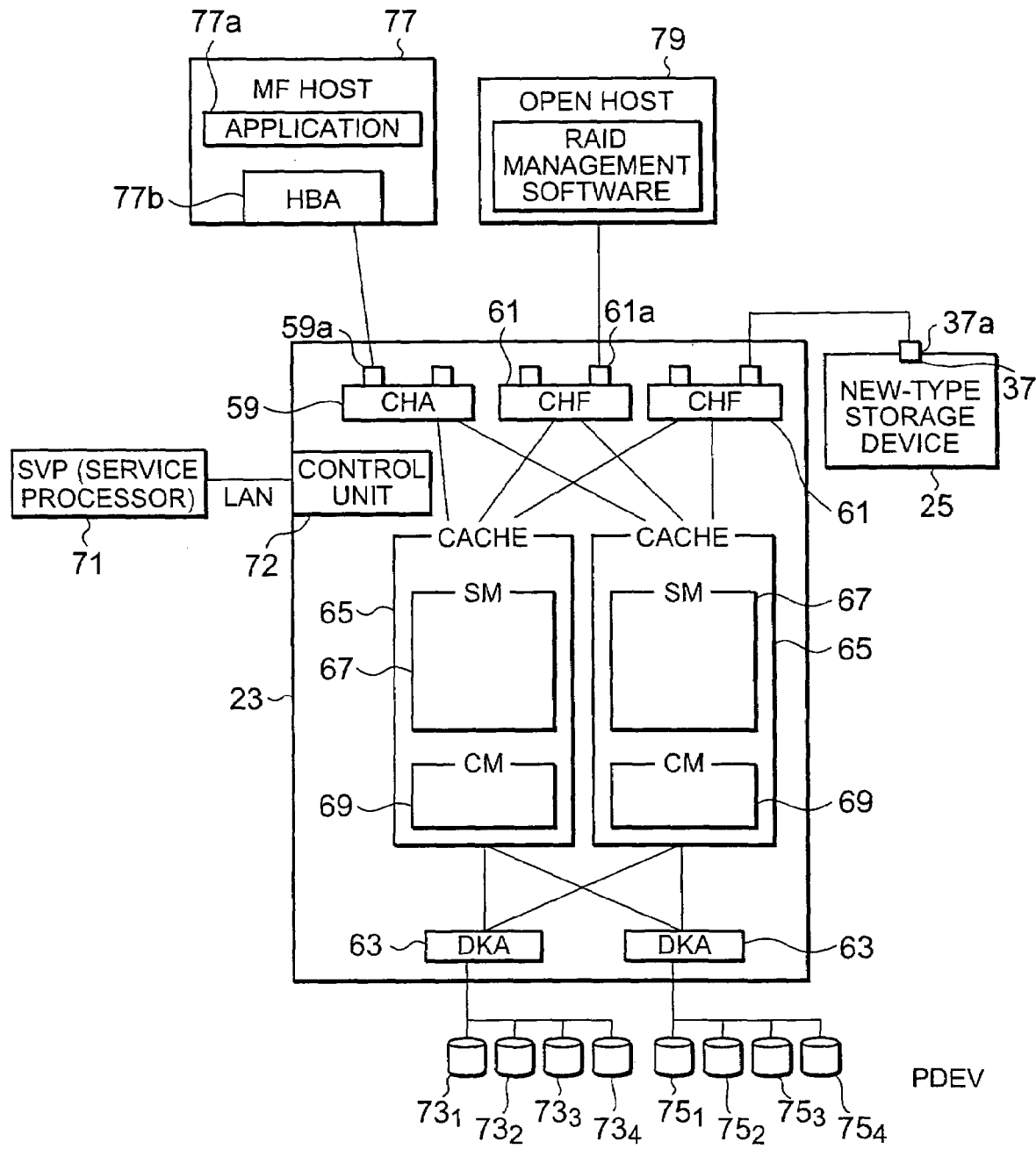
FIG. 4 is a block diagram showing the overall configuration of an old-type storage device comprised by the storage device system of FIG. 2.

FIG. 4 is a block diagram showing the overall configuration of an old-type storage device comprised by the storage device system of FIG. 2.

In FIG. 4, the configuration of the old-type storage device 23 is essentially the same as that of the new-type storage device 25.

That is, like the new-type storage device 25, the old-type storage device 23 can also be configured as an advanced-function intelligent fiber channel switch, in addition to configuring the old-type storage device 23 as for example a disk array subsystem.

Similarly to the new-type storage device 25, the old-type storage device 23 also can be broadly divided into a controller portion and a storage device portion; the controller portion comprises, for example, a plurality of CHAs 59 (in FIG. 4, only one is shown), a plurality of CHFs 61 (in FIG. 4, only two are shown), and a plurality of DKAs (in FIG. 4, only two are shown). In addition to the above, the controller portion further comprises SM 67 and CM 69, installed on a plurality of caches 65 (in FIG. 4, only two are shown), and a SVP 71, connected for example via a LAN. The storage device portion comprises a plurality of PDEVs ($73_1$ to $73_4$, $75_1$ to $75_4$). As PDEVs ($73_1$ to $73_4$, $75_1$ to $75_4$), for example, hard disks, flexible disks, magnetic tapes, semiconductor memory units, optical discs, or similar can be used.

The CHA 59 performs data communication with an MF host 77 via a communication port 59a and mainframe communication network. The CHF 61 on the left side in FIG. 4 performs data communication with an open-system host 79 via a target port 61a and a fiber channel, which is an open-system communication network. The CHF 61 on the right side in FIG. 4 comprises a communication port, that is, a target port 61a, to perform data communication with the new-type storage device 25 (initiator port 37a comprised by CHF 37) via for example a fiber channel which is an open-system communication network.

Because the above-described configuration is similar to that of the new-type storage device 25 shown in FIG. 3, a detailed explanation is omitted.

Next, conditions in the above-described storage device system (shown in FIG. 2) under which functions are realized for an MF host 21 to access the mainframe data (MF data) of an old-type storage device 23 via a new-type storage device 25 are explained.

(1) An LDEV B33, which is a MF VOL (mainframe volume) of the old-type storage device 23, must be made visible as an open-system volume from the side of the new-type storage device 25, by enabling reading and writing by an open-system host (for example, open-system host 41 or similar) via an open-system I/F and the new-type storage device 25.

(2) As a condition related to (1), it is necessary to make LDEV B33 visible as an open-system volume, including the VTOC area described below, from the new-type storage device 25, by enabling reading and writing of all storage areas of the LDEV B33 by an open-system host (for example, open-system host 41 or similar) via an open I/F and new-type storage device 25.

(3) In the new-type storage device 25, it must be possible to map the LDEV B33, which is an MF VOL of the old-type storage device 23, as LDEV A39 which is an MF VOL of the new-type storage device 25.

(4) In the new-type storage device 25, it must be possible to convert the MF VOL format of the old-type storage device 23 into the MF VOL format of the new-type storage device.

Next, a method is explained to enable reading and writing by an open-system host (for example, open-system host 41 or similar) of LDEV B33, which is an MF VOL of the old-type storage device 23, via an open-system I/F and the new-type storage device 25.

In order to enable reading and writing of LDEV B33 (which is an MF VOL of the old-type storage device 23) via an open-system I/F and the new-type storage device 25 by an open-system host (for example, the open-system host 41 or similar), LDEV B33 must be allocated as a LUN (logical number) to a port of CHF PK (for example, CHF 61), which is a P/K (package) having an open fiber I/F. However, an MF emulation type (here, "emulation type" denotes a type of disk visible from a high-level device such as for example a host) LDEV cannot be allocated as a LUN to the port of CHF PK. On the other hand, when the emulation type is the LDEV of an intermediate VOL, a user area of an MF LDEV (mainframe LDEV) can be made readable and writable by an open-system host (for example, open-system host 41 or similar) (can be used to share backups with an MF open system), and so can be allocated as a LUN to a port of the above CHF PK.

Hence in the above-described storage device system, a method was selected in which, in order to enable reading and writing of an MF VOL (mainframe volume) (for example, LDEV B33) by an open-system host (for example, open-system host 41 or similar) via an open-system I/F and the new-type storage device 25, by making the emulation type the intermediate VOL, the LDEV (LDEV B33) is allocated as a LUN to a port of CHF PK. However, only the user area of the intermediate VOL can be read and written by an open-system host (for example, open-system host 41 or similar), and reading and writing is not possible in, for example, the VTOC area or other MF (mainframe) control areas, or in control information areas comprising for example MF replacement cylinder information or similar.

Figure 5:
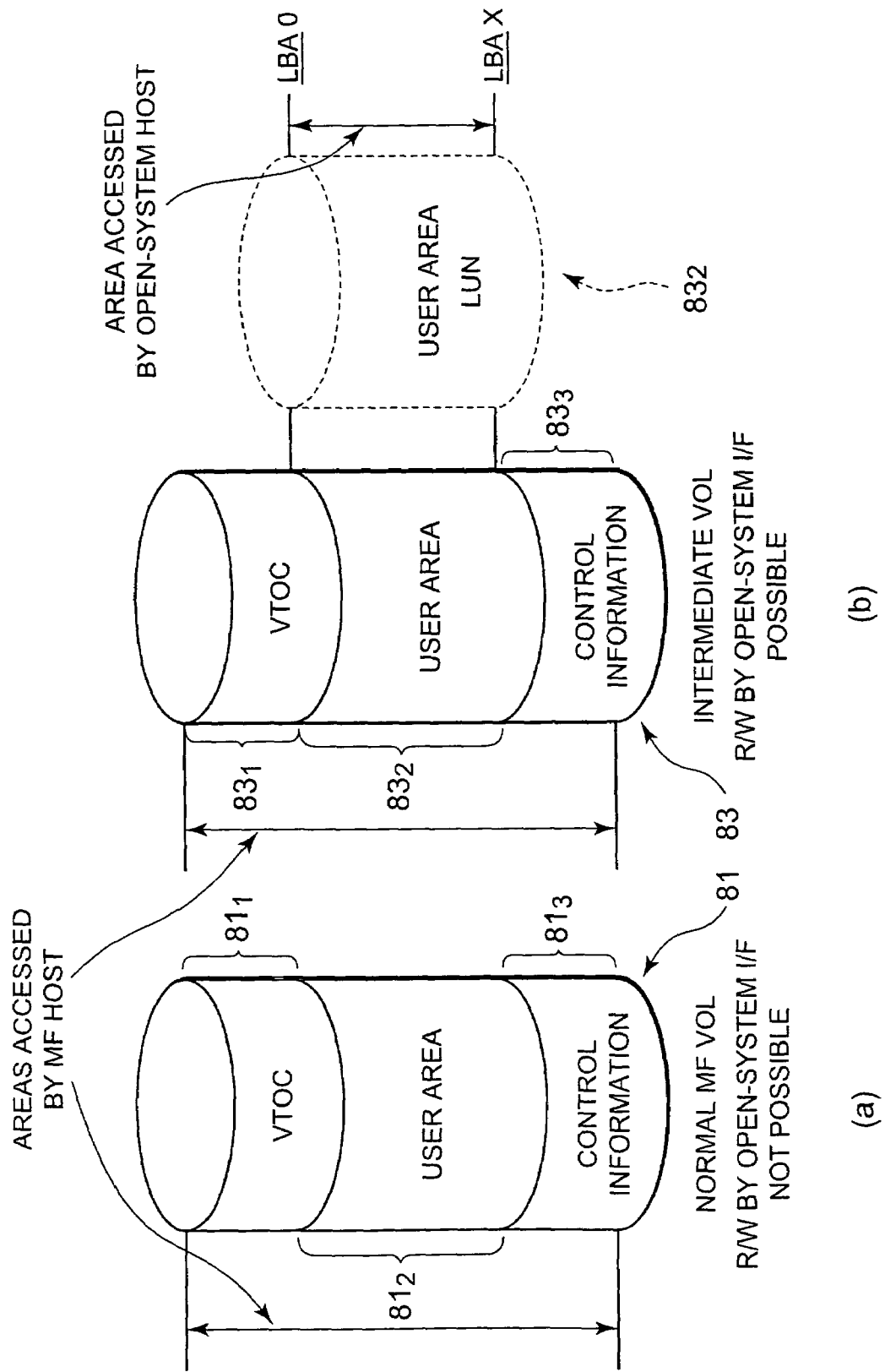
FIG. 5 is an explanatory drawing comparing and contrasting a normal MF VOL employed in the storage device system of FIG. 2, and a preexisting intermediate VOL.

FIG. 5 is an explanatory drawing comparing and contrasting a normal MF VOL (mainframe volume) employed in the above-described storage device system (FIG. 2), and a pre-existing (current) intermediate VOL.

In FIG. 5, the normal MF VOL 81 shown in (a) of FIG. 5 has a VTOC area $81_1$ which is an MF control area, a user area $81_2$, and a control information area $81_3$. The normal MF VOL 81 cannot be read or written by an open-system host (for example, open-system host 41 or similar) via an open-system I/F. The VTOC area $81_1$, user area $81_2$, and control information area $81_3$ are areas which can be accessed by an MF host (21 or similar). The current-state intermediate VOL 83 shown in (b) of FIG. 5, like the normal MF VOL 81, has a VTOC area $83_1$, a user area $83_2$, and a control information area $83_3$. As described below, in the current state the intermediate VOL 83 can be read and written only in the user area $83_2$ by an open-system host (for example, open-system host 41 or similar), via an open-system I/F. In the current-state intermediate VOL 83 also, the VTOC area $83_1$, user area $83_2$, and a control information area $83_3$ are areas which can be accessed by an MF host (21 or similar).

Next, the reason for the inability of an open-system host (for example, the open-system host 41 or similar) to read and write to other than the user area $83_2$ of the intermediate VOL 83 is explained below.

The area to which an open-system host (for example, the open-system host 41 or similar) can read and write in the intermediate VOL 83 is the range from LBA (Logical Block Address) 0 to the value of MAX LBA, which is obtained by a Read Capacity command, used to determine the open-system capacity. In the intermediate VOL 83, as shown in (b) of FIG. 5, with the beginning of the user area $83_2$ taken to be LBA 0, and the size of the user area $83_2$ taken to be the MAX LBA value (in the example of FIG. 5, X), because the Read Capacity command is used to report to the open-system host, the open-system host (for example, the open-system host 41 or similar) cannot access areas other than the above via the open-system I/F.

Hence in this specification, a method is proposed to enable reading and writing of all areas of an LDEV B33, which is a MF VOL of the old-type storage device 23, by an open-system host (for example, the open-system host 41 or similar) via an open-system I/F and new-type storage device 25. That is, as is clear from the above explanation, in order to enable reading and writing to all areas of LDEV B33 of the old-type storage device 23 by an open-system host (for example, the open-system host 41 or similar) via the new-type storage device 25 and an open-system I/F, the beginning of the storage area of the LDEV B33 must be LBA 0, and the size (total storage area) of the storage area of the LDEV B33 must be reported to the open-system host (for example, the open-system host 41) using the Read Capacity command from the side of the LDEV B33, via the I/F and new-type storage device 25.

Figure 6:
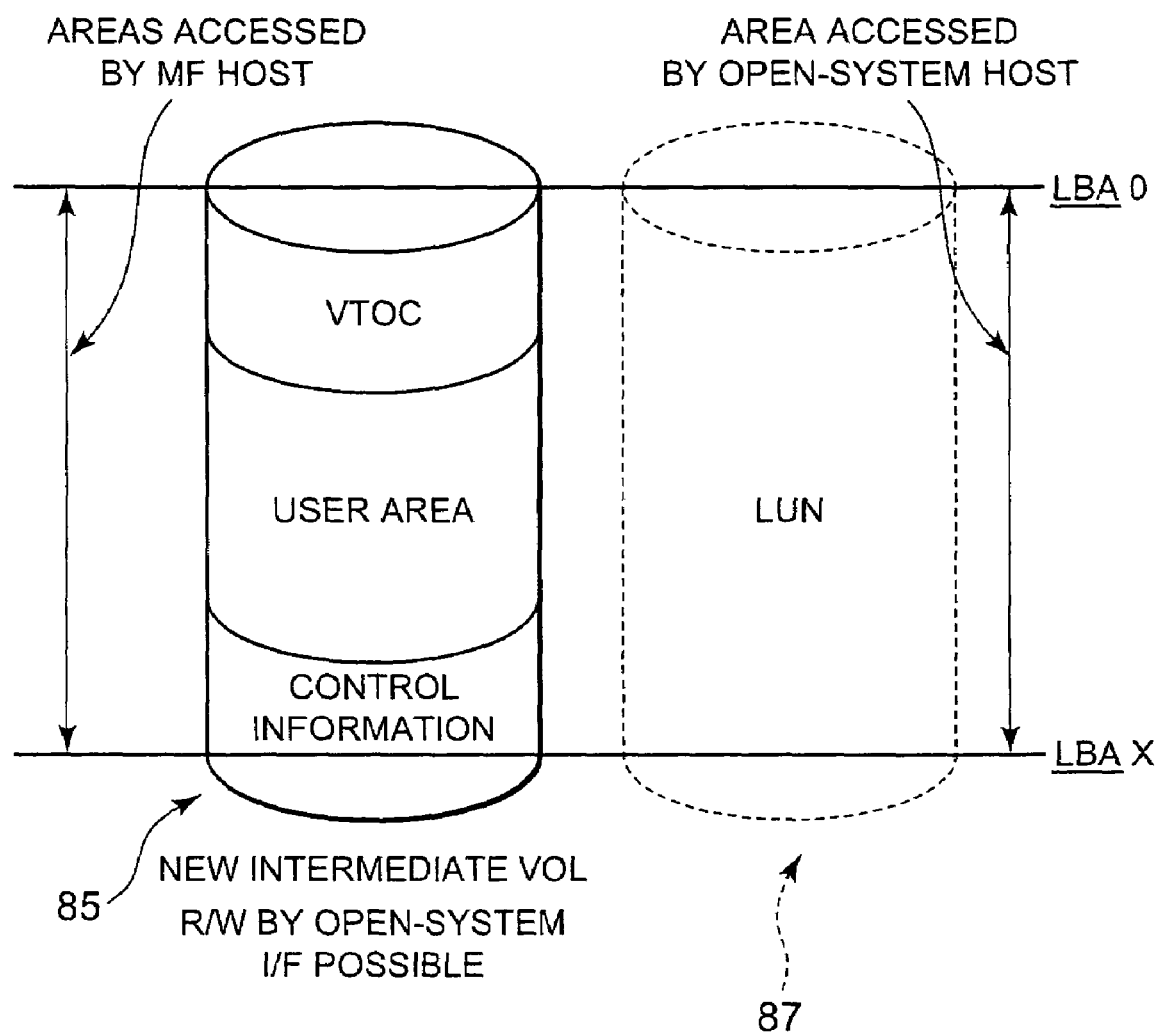
FIG. 6 is an explanatory drawing showing a first method of enabling reading and writing by an open-system host of all storage areas of LDEV in an old-type storage device, which is an MF VOL, via a new-type storage device and an open-system I/F.

FIG. 6 is an explanatory drawing showing a first method of enabling reading and writing by an open-system host of all storage areas of LDEV B33, which is an MF VOL, in an old-type storage device 23, via a new-type storage device 25 and an open-system I/F.

The first method shown in FIG. 6 involves creating a new emulation type of intermediate VOL, different from the intermediate VOL in the current state (comprising those for which only reading is possible, those for which only writing is possible, and those for which reading and writing are possible), so as to enable reading and writing by an open-system host (for example the open-system host 41 or similar) of all storage areas of an LDEV (for example LDEV B33) via an open-system I/F.

In FIG. 6, the symbol 85 denotes a newly-created emulation-type intermediate VOL (new intermediate VOL), differing from the current intermediate VOL, and symbol 87 denotes a LUNS which is a VDEV (virtual device) of the new intermediate VOL 85. All the storage areas of the new intermediate VOL 85 are accessed by an MF host (for example, MF host 21 or similar) via an open-system I/F, and all storage areas of the LUN 87 are accessed by an open-system host (for example, open-system host 41 or similar) via the new-type storage device 25 and an open-system I/F.

As explained above, by defining an intermediate VOL, the intermediate VOL can be seen by an open-system host (for example, the open-system host 41 or similar) as a normal VOL (open-system VOL). However, this alone would mean that an open-system host (for example, the open-system host 41 or similar) could read and write only to the user area of the intermediate VOL, but that when an MF VOL is created in a new storage device (for example the new-type storage device 25), a VTOC area and control information area could not be created in the user area of the MF VOL (corresponding to the user area in the original intermediate VOL). Hence the sizes of the user area in the MF VOL and of the user area in the original intermediate VOL do not coincide, and so there is the problem that even if for example an open-system host attempts to access the VTOC area in the MF VOL, another area, and not the VTOC area, is accessed.

Hence in the above-described first method, an open-system host creates a new emulation-type intermediate VOL, differing from the emulation type of the current-state intermediate VOL, enabling all storage areas of the intermediate VOL, including the VTOC area, control information area, and similar, to be read via a new-type storage device 25 and open-system I/F.

Next, the procedure in the storage system shown in FIG. 2 to realize mapping from LDEV B33, which is an MF VOL of the old-type storage device 23, to LDEV A39, which is an MF VOL of the new-type storage device 25, is explained.

The attributes of a port 37a of the CHF 37 of the new-type storage device 25 are set as the initiator port, and this initiator port 37a is connected to a port 61a of the CHF 61 of the old-type storage device 23 by a fiber cable.

Next, a Report LUN (command to inquire as to the number of LUs), Inquiry (command to request transfer of the SCSI version, SCSI equipment specifications, product ID, and other data), TUR (Test Unit Ready, that is, a command to inquire whether equipment is ready or not ready), and Read Capacity Command (command to request transfer of the maximum LBA, block length, and other information) are issued to the old-type storage device 23 from the CHF 37 of the new-type storage device 25 which is the initiator, and by this means LUN information (LUN, capacity, emulation type, and similar) set in the port 61a of the old-type storage device 23 is acquired. Mapping is then performed to the LDEV A39 which is a VDEV of the new-type storage device 25 using the acquired LUN information; by setting the emulation type to MF VOL at the time of mapping, the mapped VDEV A39 can be accessed by a MF host (for example, MF host 21 or similar) connected to the new-type storage device 25.

FIG. 7 is an explanatory drawing showing a VDEV information table comprised by the new-type storage device 25. FIG. 8 is an explanatory drawing showing a LDEV information table comprised by the new-type storage device 25. FIG. 9 is an explanatory drawing showing a LUN information table comprised by the new-type storage device 25. These information tables are stored in the new-type storage device 25 shown in FIG. 3.

In FIG. 7, the VDEV information table is a table necessary for mapping of devices, and is related to the VDEV 87 of the above-described new intermediate VOL 85 (explained in FIG. 6). The VDEV information table is a table used when connecting the new-type storage device 25 to a MF host (for example, the MF host 21 or similar). The VDEV information table has, for example, a number VDEV#[0] to identify the VDEV; the VDEV size; LDEV#, which indicates the LDEV to which the VDEV is mapped; and Port#[0] to Port#[n], indicating CHF ports to which an external storage device (in this aspect, the old-type storage device 23; similarly below) is connected. The VDEV information table comprises, in addition to the above, a vendor name for the external storage device; a device type indicating the name of the external storage device; a LUN indicating the LUN of the external storage device; and an external LUN emulation type indicating the emulation type of the LUN of the external storage device. In addition to the above, the VDEV information table also has WWN[0] through WWN[n], indicating WWNs of LUNs of the external storage device, and an external LUN capacity "LBA" indicating the value obtained by the Read Capacity command for the external storage device LUN.

Next, the LDEV information table in FIG. 8 is a table which stores information on the LDEV which is to be made visible to an MF host (for example, the MF host 21 or similar) with respect to the mapped VDEV, and is used when the new-type storage device 25 is connected to an MF host (for example the MF host 21 or similar). The LDEV information table comprises, for example, LDEV#[0] through LDEV#[n], which are numbers to identify the LDEV; the LDEV size; a VDEV# indicating in which VDEV in the VDEV information table shown in FIG. 7 the VDEV is stored; and an emulation type indicating the LDEV emulation type.

Next, the LUN information table in FIG. 9 is an information table used when connecting the new-type storage device 25 to an open-system host (for example open-system host 41 or similar), and comprises Port#0 to Port#n, which are numbers used to identify a port employed for connection; LUN0 to LUNn, which are numbers to identify the LUN; LDEV indicating the LDEV to which mapping is performed; and a host mode. The host mode is explained in detail below.

Figure 10:
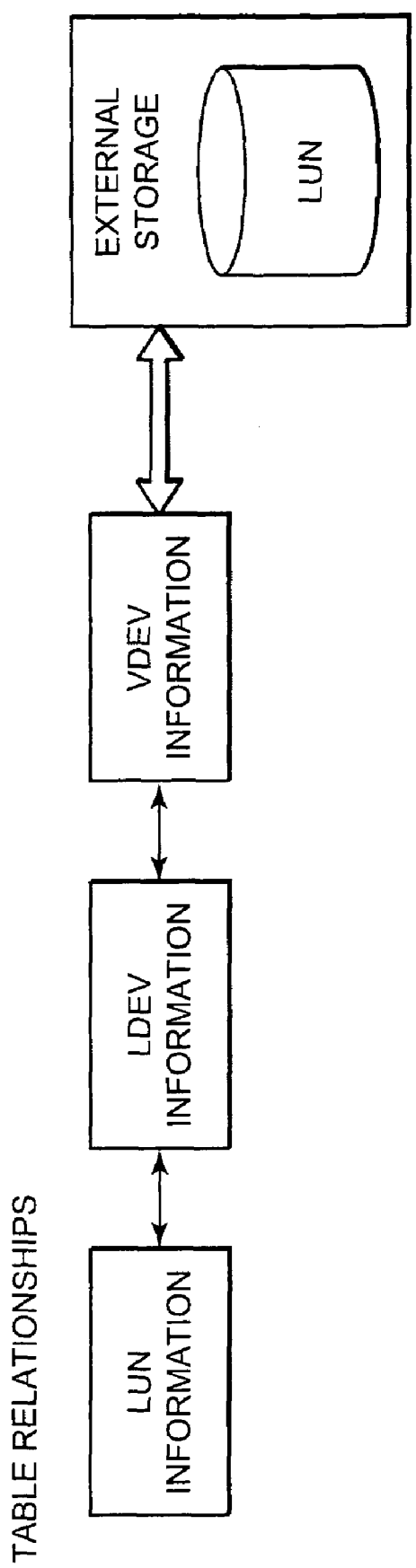
FIG. 10 is an explanatory drawing showing the interrelations between a LUN information table, LDEV information table, and VDEV information table.

FIG. 10 is an explanatory drawing showing the interrelations between a LUN information table, LDEV information table, and VDEV information table. As shown in the drawing, there are interrelations between the LUN information table and the LDEV information table, between the LDEV information table and the VDEV information table, and between the VDEV information table and external storage (for example, the old-type storage device 23).

As explained above, the LUN information table shown in FIG. 9 stores the LDEV to which the LUN (for example, LUN0) is mapped, that is, the "LDEV" information on the relationship between a LUN (for example, LUN0) and the (mapped) LDEV. The LDEV information table shown in FIG. 8 stores "VDEV#" information the VDEV to which an LDEV (for example, LDEV#0) is mapped, that is, the relation between the LDEV (for example LDEV#0) and the (mapped) VDEV. And, the VDEV information table shown in FIG. 7 stores "LDEV#" information on the LDEV (LDEV#) to which a VDEV is mapped, that is, a VDEV and the (mapped) LDEV. The VDEV information table also stores information (vendor name, device type, and similar) indicating the external storage device (for example, the old-type storage device 23) to which the VDEV (for example, VDEV#[0]) is connected.

Next, the method of conversion between the MF Vol format in the old-type storage device 23 and the MF Vol format in the new-type storage device 25 is explained.

When conversion from cylinders to (cache) block addresses in the old-type storage device 23 and conversion from cylinder addresses to (cache) block addresses in the new-type storage device 25 are the same, a conversion table for conversion from cylinder addresses to (cache) block addresses is unnecessary. However, by providing the new-type storage device 25 with a conversion table for each emulation type, set by type of external storage device (excluding the old-type storage device 23), external storage devices other than the old-type storage device 23 can also be supported.

FIG. 11 is an explanatory drawing showing an example of address conversion performed in the new-type storage device 25 and in the old-type storage device 23 when an MF host (for example, the MF host 21 or similar) or an open-system host (for example, the Open host 41 or similar) accesses the old-type storage device 23 via the new-type storage device 25.

In FIG. 11, (a) shows an example of an address conversion method in the new-type storage device 25 and old-type storage device 23 when an MF host (for example, the MF host 21 or similar) accesses the old-type storage device 23 via the new-type storage device 25. In order for the MF host to access the MF Vol using a cylinder image, first a process is necessary to convert a cylinder number into a slot number which is a block address in the cache, and this process is followed by distribution among a plurality of PDEVs (physical devices) on the side of the old-type storage device 23 (the storage device storing the original MF data) and on the side of the new-type storage device 25 (that is, the PDEV corresponding to the above converted block address among the above plurality of PDEVs is determined).

In FIG. 11, (b) shows an example of an address conversion method in the new-type storage device 25 and old-type storage device 23 when an open-system host (for example, the open-system host 41 or similar) accesses the old-type storage device 23 via the new-type storage device 25. In order for the open-system host to access the open-system volume using an LBA (Logical Block Address), first a process is necessary to convert from an LBA to a block address in the above-described cache, and this process is followed by distribution among a plurality of PDEVs on the side of the old-type storage device 23 and the new-type storage device 25 (that is, the PDEV corresponding to the above converted block address among the above plurality of PDEVs is determined).

FIG. 12 is an explanatory drawing showing one example of a conversion method used in address conversion in the old-type storage device 23 (shown in FIG. 11). By performing address conversion using the conversion method of FIG. 12, data reading and writing to cache in the old-type storage device 23 is possible.

In FIG. 12, (a) shows an example of a method to convert from a cylinder number for I/O (a read or write instruction) from an MF host (for example, the MF host 21) to a slot number address. In (a) of FIG. 12, the cylinder number "0" corresponds to slot number address "0", cylinder number "1" corresponds to slot number address "15", cylinder number "2" corresponds to slot number address "30", and so on.

In FIG. 12, (b) shows an example of a method to convert from an LBA of I/O (for example, access to a LUN such as the LUN 87 shown in FIG. 6) from an open-system host (for example, the open-system host 41 or similar) to a slot number address. In (b) of FIG. 12, the LBA "0" corresponds to "0/0" indicating slot number address "0" and subblock number address "0", LBA "1" corresponds to "0/1" indicating slot number address "0" and subblock number address "1", the LBA "2" corresponds to "0/2" indicating slot number address "0" and subblock number address "2", and so on.

FIG. 13 is an explanatory drawing showing the conversion method used in address conversion performed in the new-type storage device 25 when an MF host (for example, MF host 21 or similar) or an open-system host (for example, open-system host 41 or similar) accesses the old-type storage device 23 via the new-type storage device 25.

In FIG. 13, (a) shows an example of a method to convert from a cylinder number for I/O (a read or write instruction) from an MF host (for example, MF host 21 or similar) to a slot number address. In (a) of FIG. 13, similarly to (a) in FIG. 12, the cylinder number "0" corresponds to slot number address "0", cylinder number "1" corresponds to slot number address "15", cylinder number "2" corresponds to slot number address "30", and so on.

In FIG. 13, (b) shows an example of a method to convert from a slot number address to an LBA upon I/O from cache (on the side of the new-type storage device 25) to the old-type storage device 23 corresponding to I/O (for example, access to a LUN such as the LUN 87 shown in FIG. 6) from an open-system host (for example, the open-system host 41 or similar). In (b) of FIG. 13, "0/0" indicating slot number address "0" and subblock number address "0" corresponds to LBA "0", "0/1" indicating slot number address "0" and subblock number address "1" corresponds to LBA "1", "0/2" indicating slot number address "0" and subblock address "2" corresponds to LBA "2", and so on.

Figure 14:
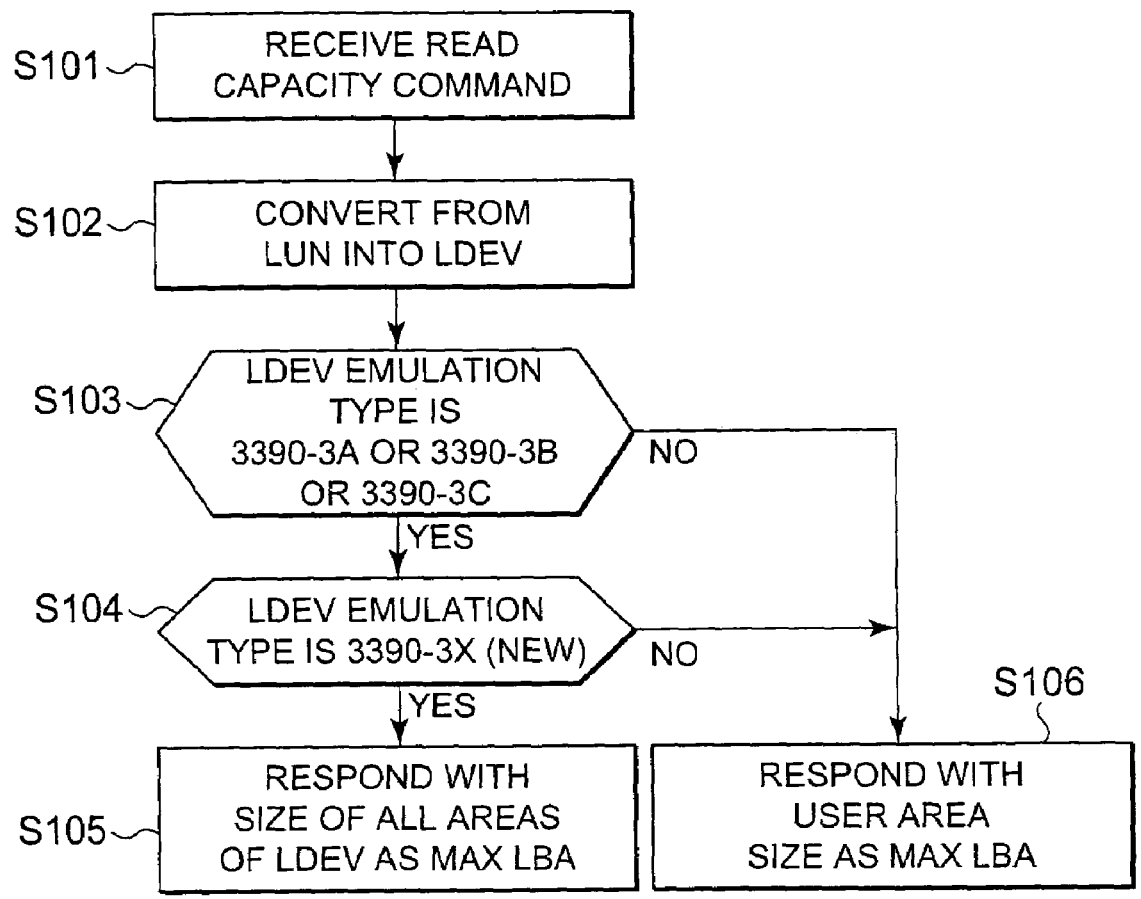
FIG. 14 is a flowchart showing the CHF processing operation of the old-type storage device when an old-type storage device of one aspect of the invention receives a read capacity command from an open-system host via the new-type storage device.

FIG. 14 is a flowchart showing the processing operation of CHF 61 of an old-type storage device 23 of one aspect of the invention when the old-type storage device 23 receives a Read Capacity command from an open-system host via the new-type storage device 25. The flowchart shown in FIG. 14 is of the first method explained using FIG. 6.

In FIG. 14, the CHF 61 first receives the Read Capacity command from an open-system host (for example, the open-system host 41 or similar) via the new-type storage device 25 (step S101). Next, using information tables comprised for example by the new-type storage device 25 and similar to the LDEV information table of FIG. 8 and the LUN information table of FIG. 9, which is an information table for use in connection of the new-type storage device 25 to an open-system host, the LUN (for example, LUN 87 shown in FIG. 6) is converted into the LDEV to which the LUN is mapped (step S102). Then, the above LDEV is checked to determine whether the emulation type is the MF emulation type intermediate VOL enabling reading only, the MF emulation type intermediate VOL enabling writing only, or the MF emulation type intermediate VOL enabling reading and writing (step S103).

If as a result of this check the emulation type of the above LDEV is neither the MF emulation type intermediate VOL enabling reading only, nor the MF emulation type intermediate VOL enabling writing only, nor the MF emulation type intermediate VOL enabling reading and writing (NO in step S103), then a check is performed to determine whether the above LDEV emulation type has been newly created (step S104). If as a result of this check the emulation type is newly created (YES in step S104), CHF 61 of the old-type storage device 23 responds to the new-type storage device 25 with the size of all storage areas of the LDEV as Max LBA (step S105).

If as a result of the above check the emulation type of the above LDEV is the MF emulation type intermediate VOL enabling reading only, or the MF emulation type intermediate VOL enabling writing only, or the MF emulation type intermediate VOL enabling reading and writing (YES in step S103), then CHF 61 of the old-type storage device 23 responds to the new-type storage device 25 with the size of the user area in the LDEV as Max LBA (step S106). Even when a check result is obtained indicating that the emulation type of the above LDEV is not newly created (NO in step S104), processing proceeds to the processing of step S106.

FIG. 15 is an explanatory drawing showing an example of a screen image displayed by the display portion of an SVP 51 connected to the new-type storage device 25 of FIG. 3. The screen image 220 shown in FIG. 15 reports to the user whether reading and writing is possible over all storage areas of the VOL in the LU emulation of the storage device (the old-type storage device 23) from an external device (seen from the new-type storage device 25).

As shown in FIG. 15, the screen image 220 displayed by the display portion of the SVP 51 comprises an external device list, that is, a list relating to the old-type storage device 23 which is an external storage device, as seen from the new-type storage device 25. In the example of FIG. 15, the above screen image 220 comprises, as information relating to a plurality of external storage devices connected to the new-type storage device, the device names of a plurality of old-type storage devices 23 and the the SINs (serial numbers), LU# (LU numbers), emulation types, (storage) capacities, and similar of each.

Figure 16:
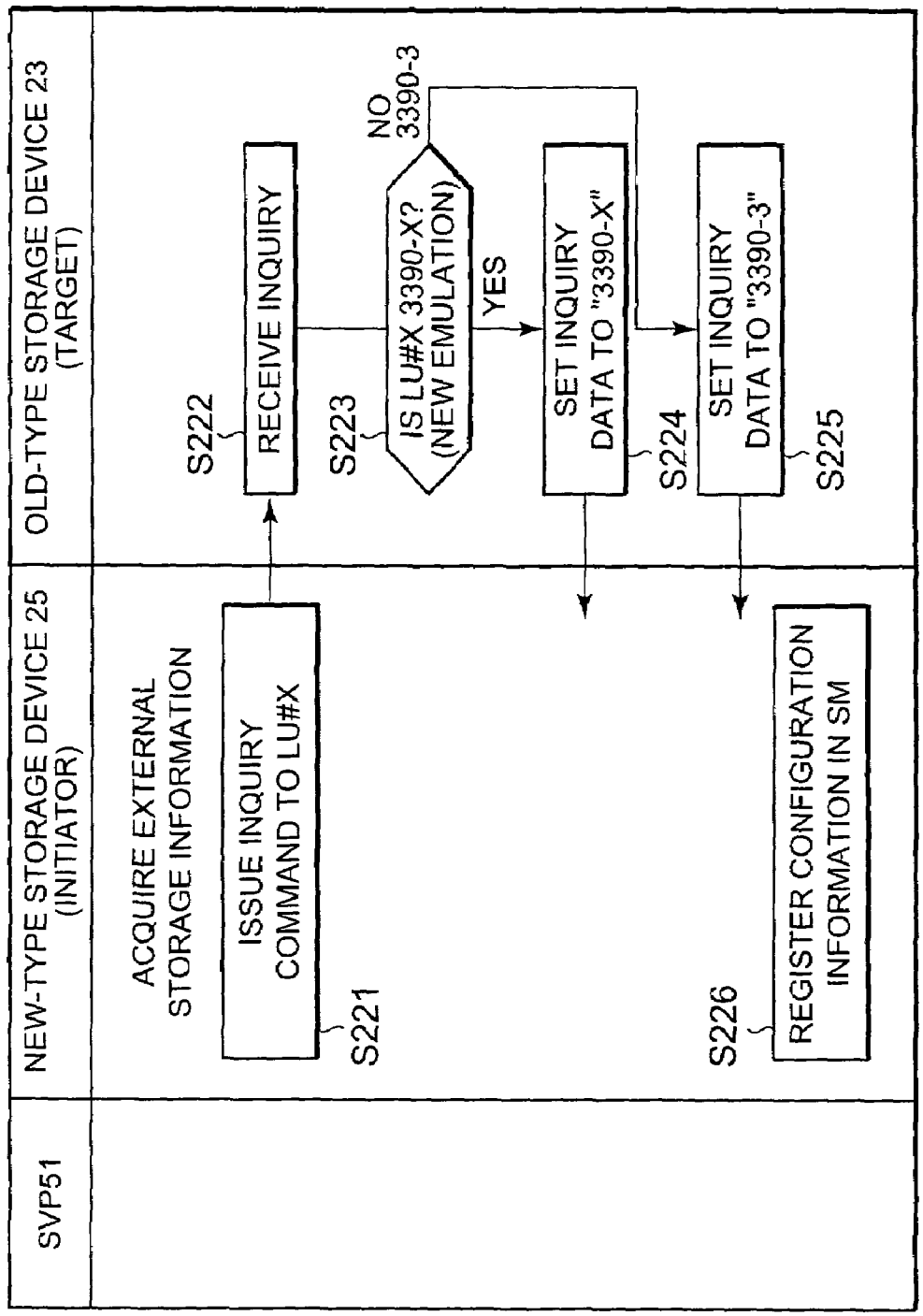
FIG. 16 is a flowchart showing the processing operation when a new-type storage device takes over MF data from an old-type storage device, and the relation to the screen image displayed on the display portion of the SVP shown in FIG. 15.
Figure 17:
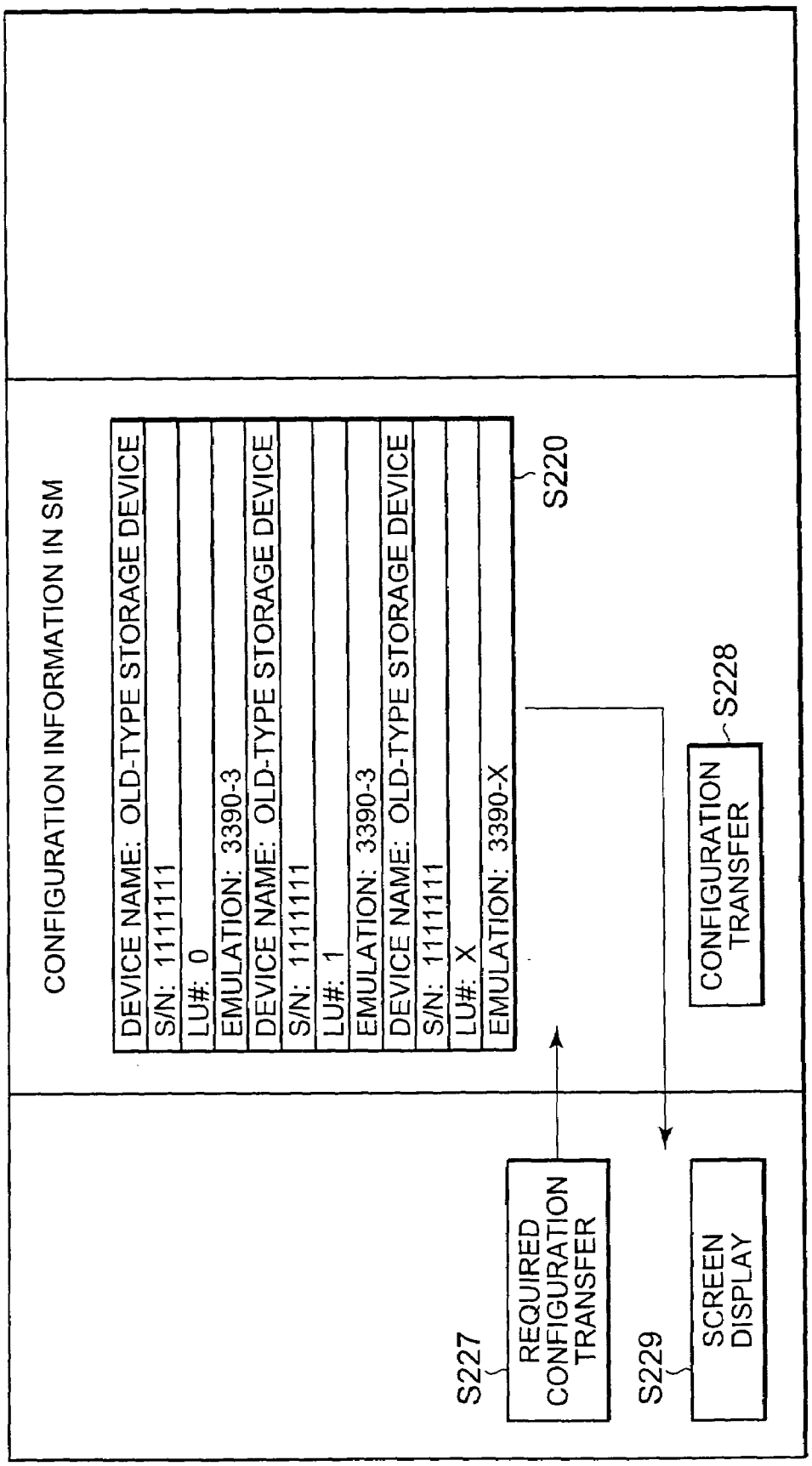
FIG. 17 is a flowchart showing the relation between processing operation when a new-type storage device takes over MF data from an old-type storage device and the screen image displayed by the display portion of the SVP shown in FIG. 15.

FIG. 16 and FIG. 17 are flowcharts showing the processing when MF data from an old-type storage device 23 is taken over by a new-type storage device 25, and the relation to the screen image 220 displayed by the display portion of the SVP 51 shown in FIG. 15.

In FIG. 16 and FIG. 17, first the new-type storage device 25 which is the initiator issues an Inquiry command to the LU#x of the old-type storage device 23 from the CHF 37, in order to acquire information relating to connected old-type storage devices, that is, to an old-type storage device 23 (step S221). Upon receiving this Inquiry command (step S222), the old-type storage device 23 which is the target checks whether the LU#x in the old-type storage device 23 is a new emulation type (step S223). If as a result of this check the LU#x is a new emulation type (YES in step S223), data indicating that LU#x is a new emulation type is transmitted to the new-type storage device 25 as data in response to the above Inquiry command (step S224).

If as a result of the above check LU#x is not a new emulation type (NO in step S223), data indicating that LU#x is an existing emulation type is transmitted to the new-type storage device 25 as data in response to the above Inquiry command (step S225). In the new-type storage device 25, the data transmitted from the old-type storage device 23 in step S224, or the data transmitted from the old-type storage device 23 in step S225, is registered as configuration information in the SM 47 (step S226).

Next, when a configuration information transfer request is transmitted from the SVP 51 to the new-type storage device 25 (step S227), configuration information 220 comprising the device name (of the external storage device, that is, the old-type storage device 23), S/N, LU#, emulation type, and similar is transferred to the SVP 51 by the old-type storage device 23 as configuration information in SM 47 (step S228). Upon receiving the configuration information 220 transmitted from the old-type storage device 23, the SVP 51 displays the configuration information 220 on the display portion (step S229).

Figure 18:
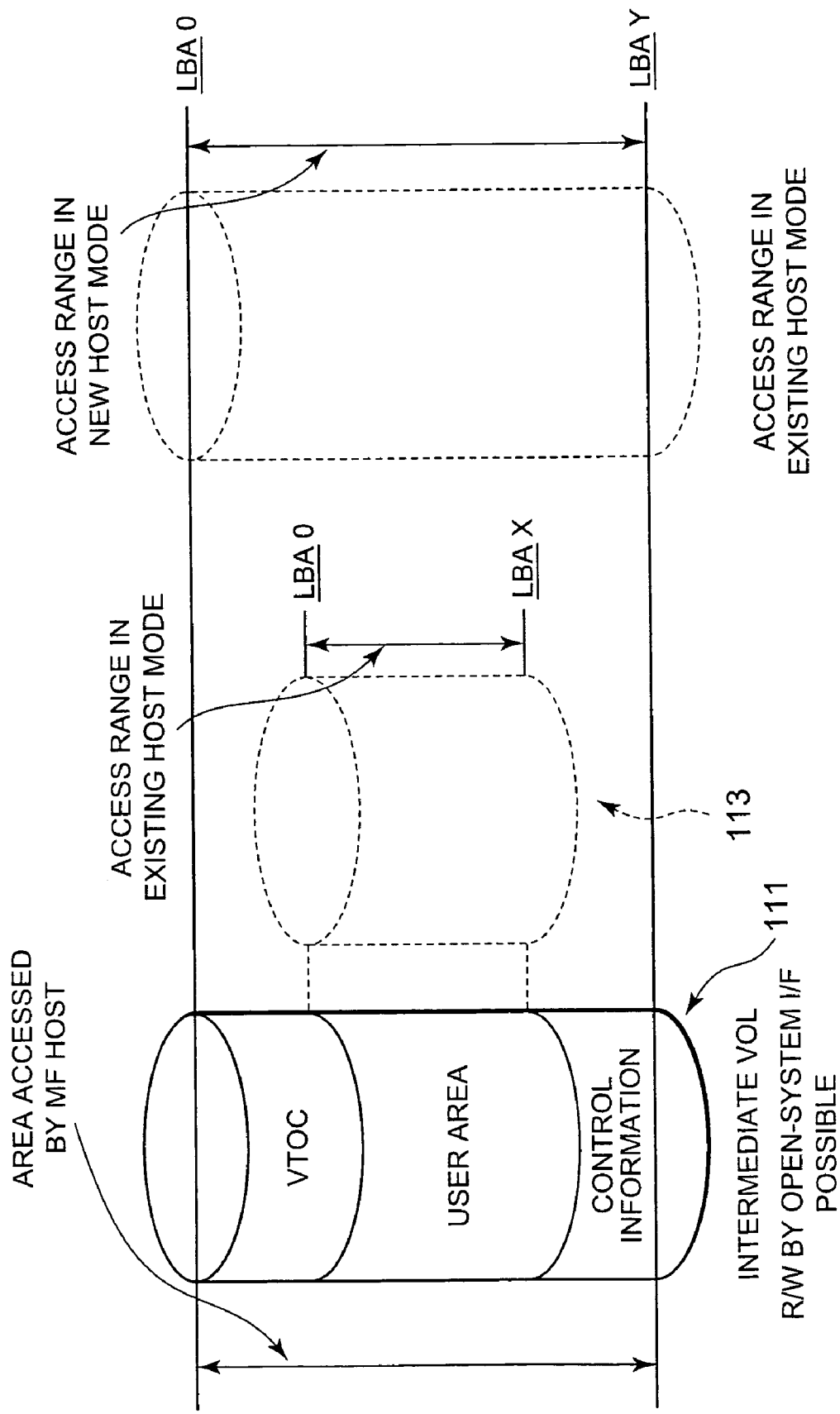
FIG. 18 is an explanatory drawing showing a second method of enabling reading and writing by an open-system host to all storage areas of LDEV of an old-type storage device which is a MF VOL, via a new-type storage device and open-system I/F.

FIG. 18 is an explanatory drawing showing a second method of enabling reading and writing by an open-system host to all storage areas of a LDEV B33 of an old-type storage device 23 which is a MF VOL, via a new-type storage device 25 and open-system I/F.

In the second method shown in FIG. 18, an intermediate VOL in the current state (enabling either reading only, or writing only, or both reading and writing) is used without modification, and a host mode is provided.

In FIG. 18, the symbol 111 denotes a current-state intermediate VOL, and the symbol 113 denotes a LUN which is a VDEV (virtual device) of the intermediate VOL 111. The area of the LUN 113 which can be read and written by an open-system host (for example, the open-system host 41 or similar) is the area from LBA 0 to the MAX LBA value, that is, the entire area of the LUN 113. In other words, the access range in the existing host mode is limited to the entire area of the LUN 113, that is, to the user area of the intermediate VOL 111. Hence in the second method shown in FIG. 18, a new host mode is provided in which the entire area of the LUN denoted by the symbol 115, that is, from LBA 0 to LBA Y which is the MAX LBA value, is the access range. The above access range LBA 0 to LBA Y corresponds to the entire storage area of the intermediate VOL 111.

Here the new host mode is such that special operation (behavior) can be performed, according to the host, when connecting the new-type storage device 25 to a certain host; the host mode can be set for each LU. By thus enabling the setting of a new host mode, responses to an Inquiry command in host mode can be made different. Functions of the second method shown in FIG. 18 are functions enabling realization of the new-type storage device 25 as the initiator and the old-type storage device 25 as the target. The above second method can make the new-type storage device 25 visible to the host from the old-type storage device 23.

Figure 19:
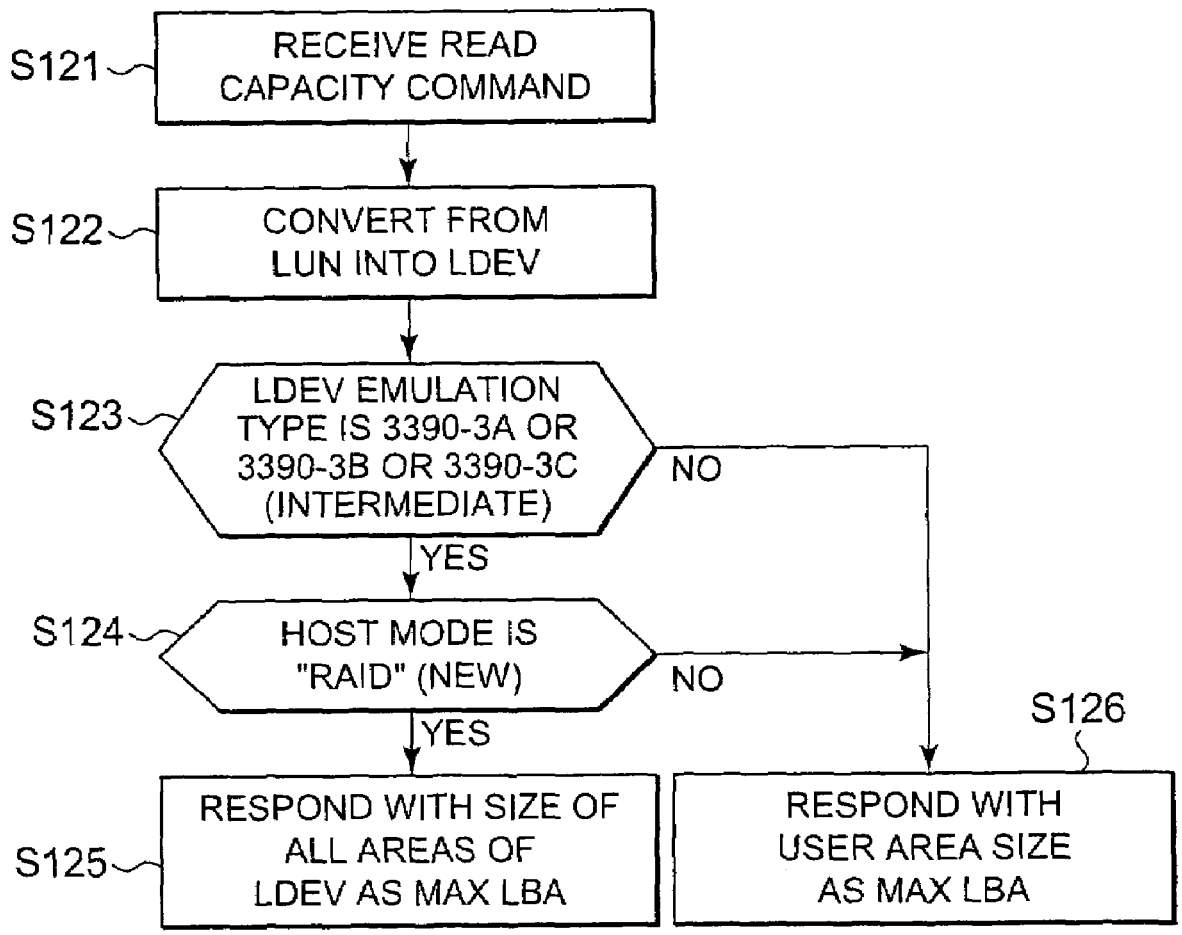
FIG. 19 is a flowchart showing the CHF processing operation of an old-type storage device when a read capacity command is received, by an old-type storage device of a modified example of an aspect of the invention, from an open-system host via a new-type storage device.

FIG. 19 is a flowchart showing the CHF 61 processing operation of an old-type storage device 23 when a Read Capacity command is received by an old-type storage device 23 from an open-system host via a new-type storage device 25, in a modified example of an aspect of the invention. The flowchart shown in FIG. 19 concerns the second method explained in FIG. 18.

In FIG. 19, the CHF 61 first receives a Read Capacity command from an open-system host (for example open-system host 41 or similar) via the new-type storage device 25 (step S121) Next, using information tables similar to the LDEV information table of FIG. 8 and the LUN information table which is the information table for connection of the new-type storage device 25 of FIG. 9 to an open-system host, and comprised for example by the new-type storage device 25, a LUN (for example the LUN 115 shown in FIG. 18) is converted into the LDEV# of the LDEV to which the LUN is mapped (step S122). Then, a check is performed to determine whether the emulation type of the above LDEV is the MF emulation type intermediate VOL enabling reading only, the MF emulation type intermediate VOL enabling writing only, or the MF emulation type intermediate VOL enabling reading and writing (step S123).

If as a result of this check the emulation type of the above LDEV is the MF emulation type intermediate VOL enabling reading only, or the MF emulation type intermediate VOL enabling writing only, or the MF emulation type intermediate VOL enabling reading and writing (YES in step S123), a check is then performed as to whether the host mode set is a new mode for "RAID" use (step S124). If as a result of this check the host mode is set to a new mode for "RAID" use (YES in step S124), the CHF 61 of the old-type storage device 23 responds to the new-type storage device 25 with the size of all storage areas of the LDEV as the Max LBA (step S125).

If as a result of the above check the emulation type of the above LDEV is neither the MF emulation type intermediate VOL enabling reading only, nor the MF emulation type intermediate VOL enabling writing only, nor the MF emulation type intermediate VOL enabling reading and writing (NO in step S123), then the CHF 61 of the old-type storage device 23 responds to the new-type storage device 25 with the size of the user area in LDEV as the Max LBA (step S126). When a check result is obtained indicating that the above host mode is not set to a new mode for "RAID" use also (NO in step S124), processing proceeds to step S126.

Figure 20:
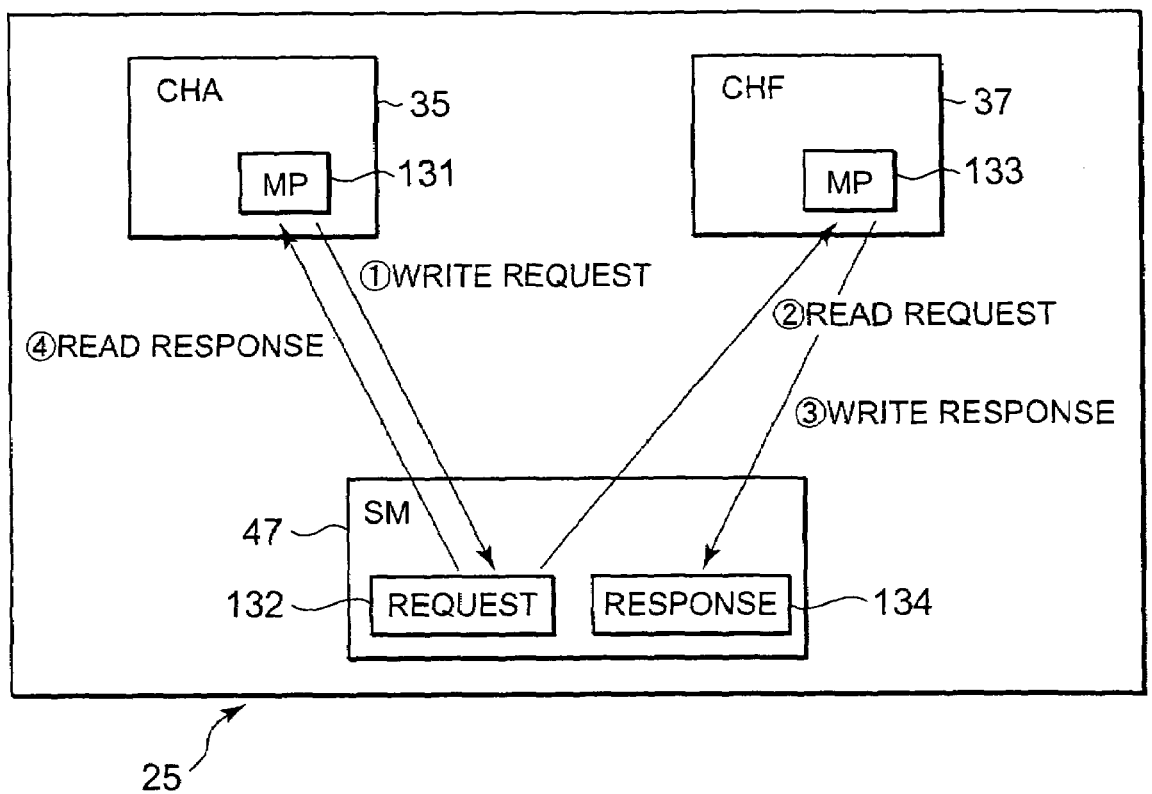
FIG. 20 is a block diagram showing the processing operation of different portions in a new-type storage device of an aspect of the invention.

FIG. 20 is a block diagram showing the processing operation of different portions in a new-type storage device 25 of an aspect of the invention.

In the new-type storage device 25, as shown in FIG. 20, communication is performed between the CHA 35 and CHF, that is, with the CHF initiator I/F 37, via the SM 47. As shown in FIG. 20, when in the new-type storage device 25 the MP (microprocessor) 131 of the CHA 35 receives a read/write request from a host (for example the MF host 21, the open-system host 41, or similar), the read/write request is written to a prescribed storage area in SM 47, as indicated by the symbol 132. On the other hand, the CHF, that is, the MP (microprocessor) 133 of the CHF initiator I/F, reads the above request 132 from the prescribed storage area of the SM 47, and transmits the above request 132 to the CHF on the side of an old-type storage device (for example, the old-type storage device 23 shown in FIG. 4), that is, to the CHF target I/F. When, as a result of receiving the above request 132, a response is transmitted from (the old-type storage device side of) the CHF target I/F, the MP 133 of the CHF initiator I/F 37 receives the response and writes the response, denoted by the symbol 134, to a prescribed storage area in the SM 47.

By this means, the MP 131 of the CHA 35 reads the above response 134 from the prescribed storage area of the SM 47, and transmits the above response 134 to the host (for example the MF host 21 or the open-system host 41, or similar) which had issued the read/write request.

Figure 21:
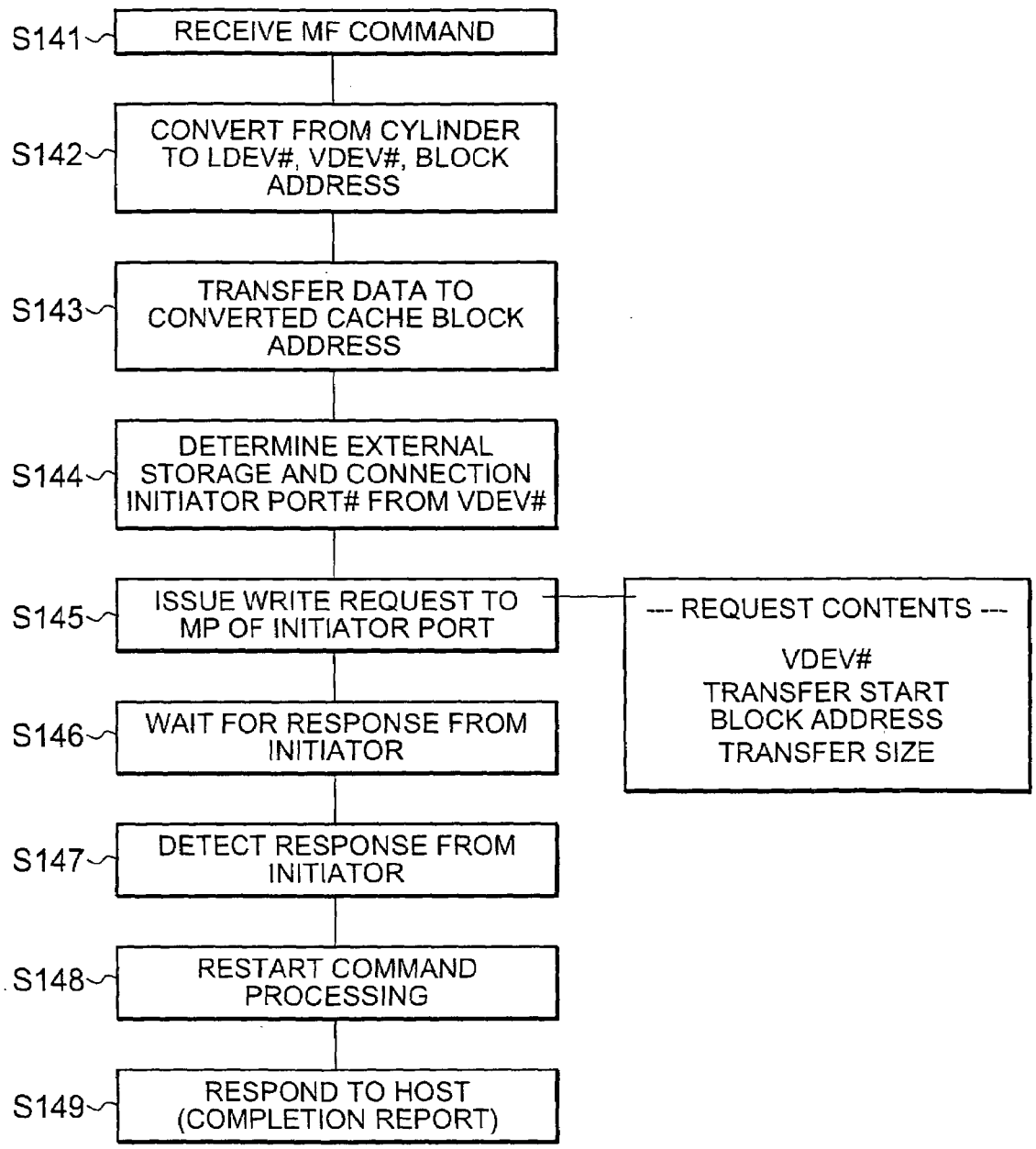
FIG. 21 is a flowchart showing the MP processing operation (write operation) of the CHA shown in FIG. 20.

FIG. 21 is a flowchart showing the processing operation (write operation) of the MP 131 of the CHA 35 shown in FIG. 20.

The flowchart shown in FIG. 21 shows that the MF host is not notified of the completion of command processing (synchronous write operation) by the MP 131 of the CHA 35 until the end of writing of data transferred from the MF host (for example, MF host 21 or similar) to the external storage device (for example, the old-type storage device 23). The MP 131 of the CHA 35 also performs processing to report to the MF host at the time of completion of data writing to a block address in the cache; this processing was explained in FIG. 20.

In FIG. 21, upon receiving a command from an MF host (for example the MF host 21 or similar) (step S141), the MP 131 of the CHA 35 uses for example the conversion method described in (a) of FIG. 12 to convert the cylinder number in the above command into a slot number, that is, into a block address in the cache, and also determines the LDEV# and VDEV# corresponding to the cache block address obtained by this conversion (step S142). Next, data transferred from an MF host (for example the MF host 21 or similar) is written to the cache block address obtained by the above conversion (step S143).

Next, the VDEV information table shown in FIG. 7, for example, is used to determine the external storage device (for example, old-type storage device 23) to be the target and the CHF initiator port number for connection (step S144), and issues a write request to the MP (131) of the CHF (37) having the initiator port thus determined. Here, the write request comprises the VDEV# of the write request, the block address at which transfer is to begin, the size of the data to be transferred, and other information (step S145). After issuing the above write request, the MP 131 of the CHA 35 enters a wait state and waits for a response from the CHF (37) having the initiator port (step S146).

In this wait state, when a response from the CHF (37) having the initiator port is detected (step S147), command processing is restarted, that is, processing operation based on the MF command is resumed (step S148), and a report to the effect that processing operation based on the MF command has been completed (completion report) is transmitted as a response to the MF host (for example, the MF host 21 or similar) (step S149).

Figure 22:
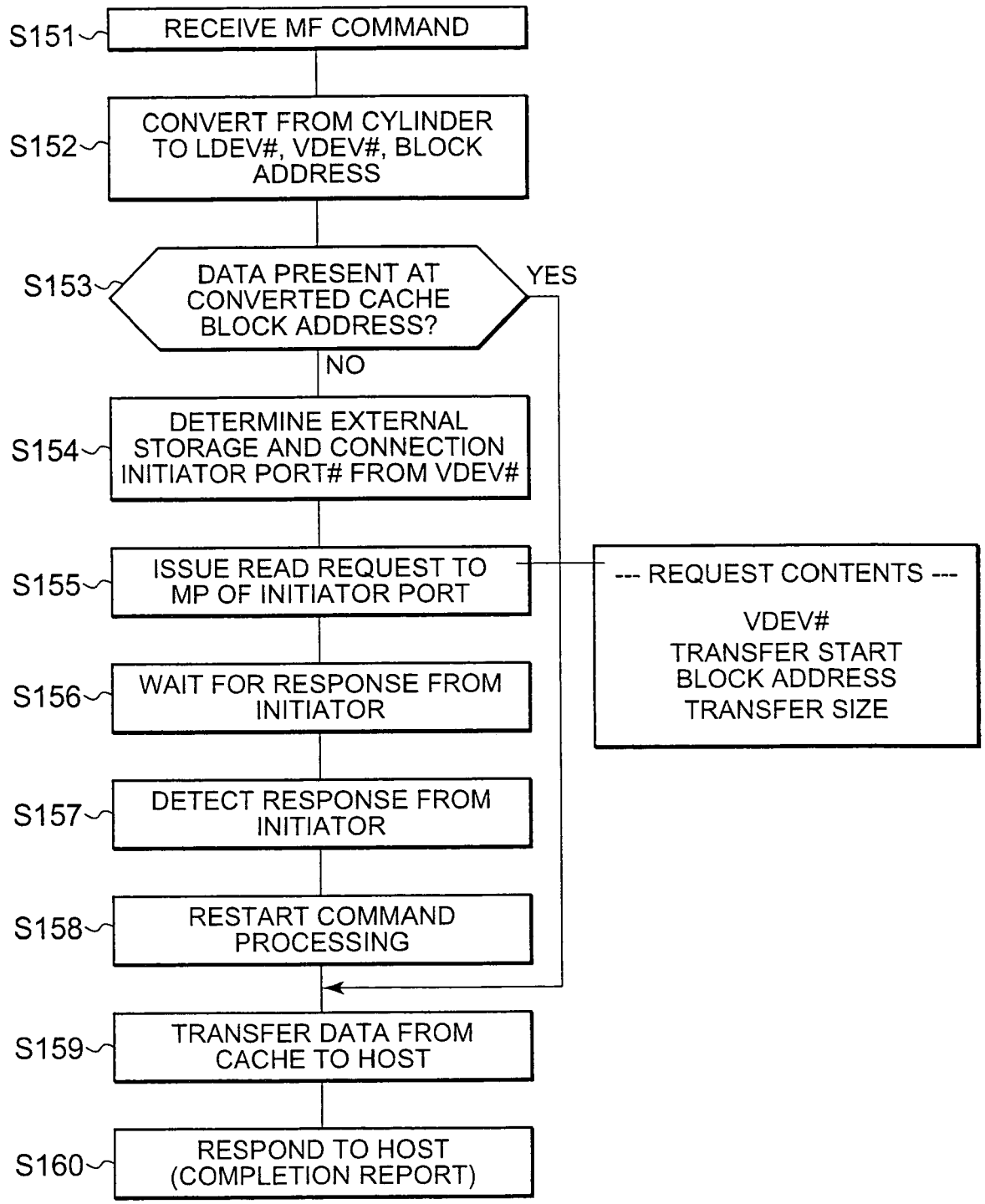
FIG. 22 is a flowchart showing the MP processing operation (read operation) of the CHA shown in FIG. 20.

FIG. 22 is a flowchart showing the processing operation (read operation) of the MP 131 of the CHA 35 shown in FIG. 20.

In FIG. 22, upon receiving a command from an MF host (for example, the MF host 21 or similar) (step S151), the MP 131 of the CHA 35 uses for example the conversion method shown in (a) of FIG. 12 to convert the cylinder number in the above command into a slot number, that is, into a cache block address, and determines the LDEV# and VDEV# corresponding to the cache block address obtained by this conversion (step S152). Next, a check is performed to determine whether data has been written to the cache block address obtained by the above conversion (step S153). If as a result of this check data has not been written to the above cache block address (NO in step S153), the VDEV information table shown in FIG. 7, for example, is then used to determine the external storage device to be the target (for example the old-type storage device 23) and the initiator port number of the CHF for connection (step S154), and in addition a read request is issued to the MP (131) of the CHF (37) of the initiator port thus determined. Here, the read request comprises the VDEV# of the read request, the block address at which to begin transfer, the size of the data to be transferred, and other information (step S155). After issuing the above read request, the MP 131 of the CHA 35 enters a wait state to wait for a response from the CHF (37) having the initiator port (step S156).

In this wait state, when a response from the CHF (37) having the initiator port is detected (step S157), command processing is restarted, that is, processing operation based on the MF command is resumed (step S158), and data transferred from the external storage device (for example the old-type storage device 23) via the CHF (37) is written to the cache block address. This data is then transferred from the above cache block address to the MF host (for example, MF host 21 or similar) (step S159). Next, a report indicating completion of processing operation based on the MF command is transmitted as a response to the MF host (for example MF host 21 or similar) (step S160).

When a check result is obtained indicating that data has been written to the above cache block address (YES in step S153), the data written to the above cache block address is transferred to the MF host (for example MF host 21 or similar) (step S159).

Figure 23:
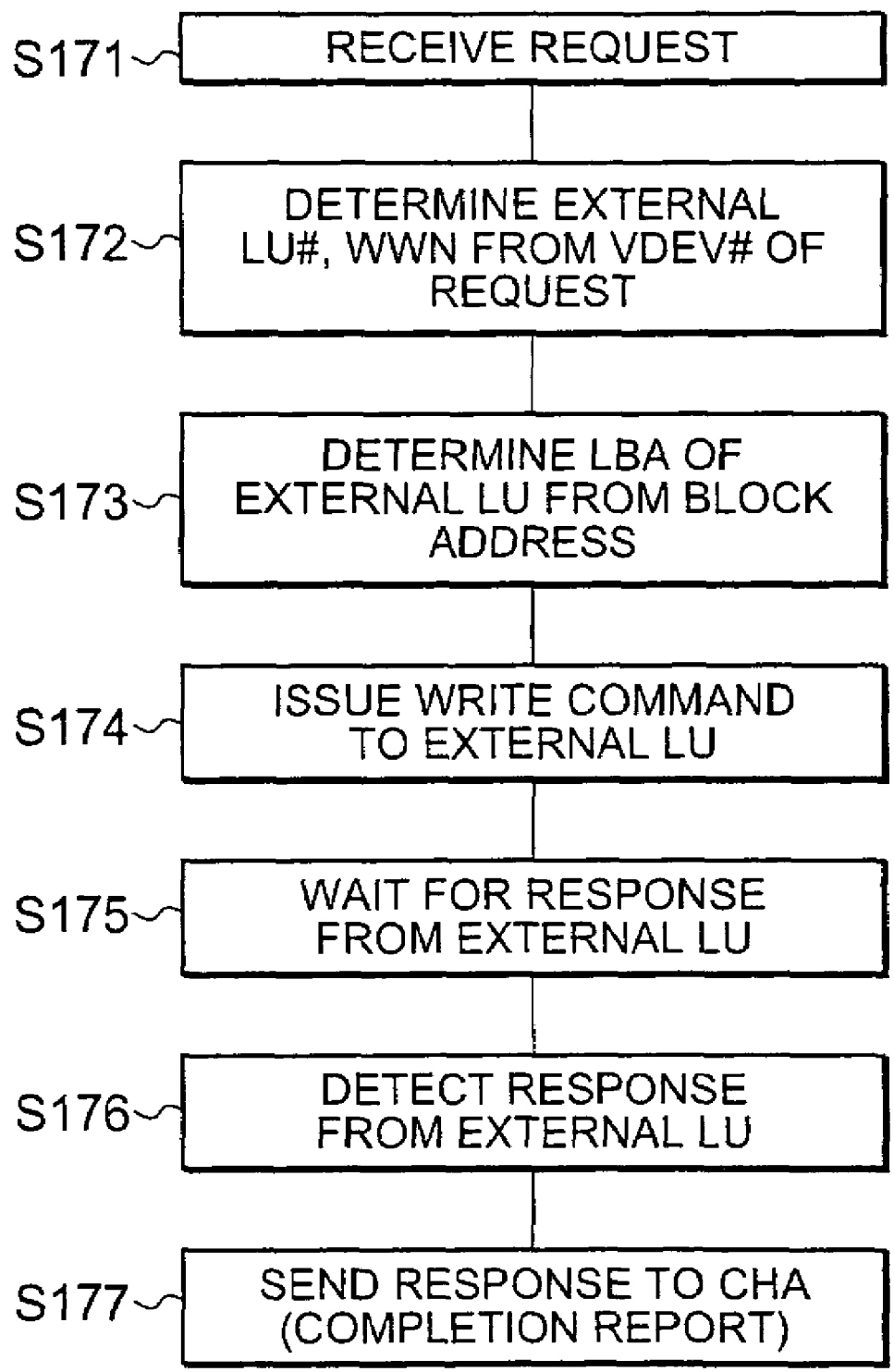
FIG. 23 is a flowchart showing the MP processing operation (write operation) of the CHF initiator I/F shown in FIG. 20.

FIG. 23 is a flowchart showing the processing operation (write operation) of the MP 133 of the CHF initiator I/F 37 shown in FIG. 20.

In FIG. 23, upon receiving a request from the MF host (MF host 21 or similar) via the CHA 35 (step S171), the MP 133 of the CHF initiator I/F 37 uses the VDEV# comprised by the request and the VDEV information table shown in FIG. 7, for example, to determine the external LU# and WWN corresponding to the VDEV# (step S172). Next, using a conversion method such as that shown in (b) of FIG. 13, the external LU (for example, old-type storage device 23) LBA is determined from the cache block address (step S173), and a write command is issued to the external LU thus determined (step S174). After issuing the above write command, the MP 133 of the CHF initiator I/F 37 enters a wait state to wait for a response from the external storage device (for example the old-type storage device 23) of the above external LU (step S175).

In this wait state, when a response from the external storage device (for example the old-type storage device 23) having the above external LU is detected (step S176), a report indicating the completion of processing operation based on the above request (completion report) is transmitted as a response to the CHA 35 (step S177).

Figure 24:
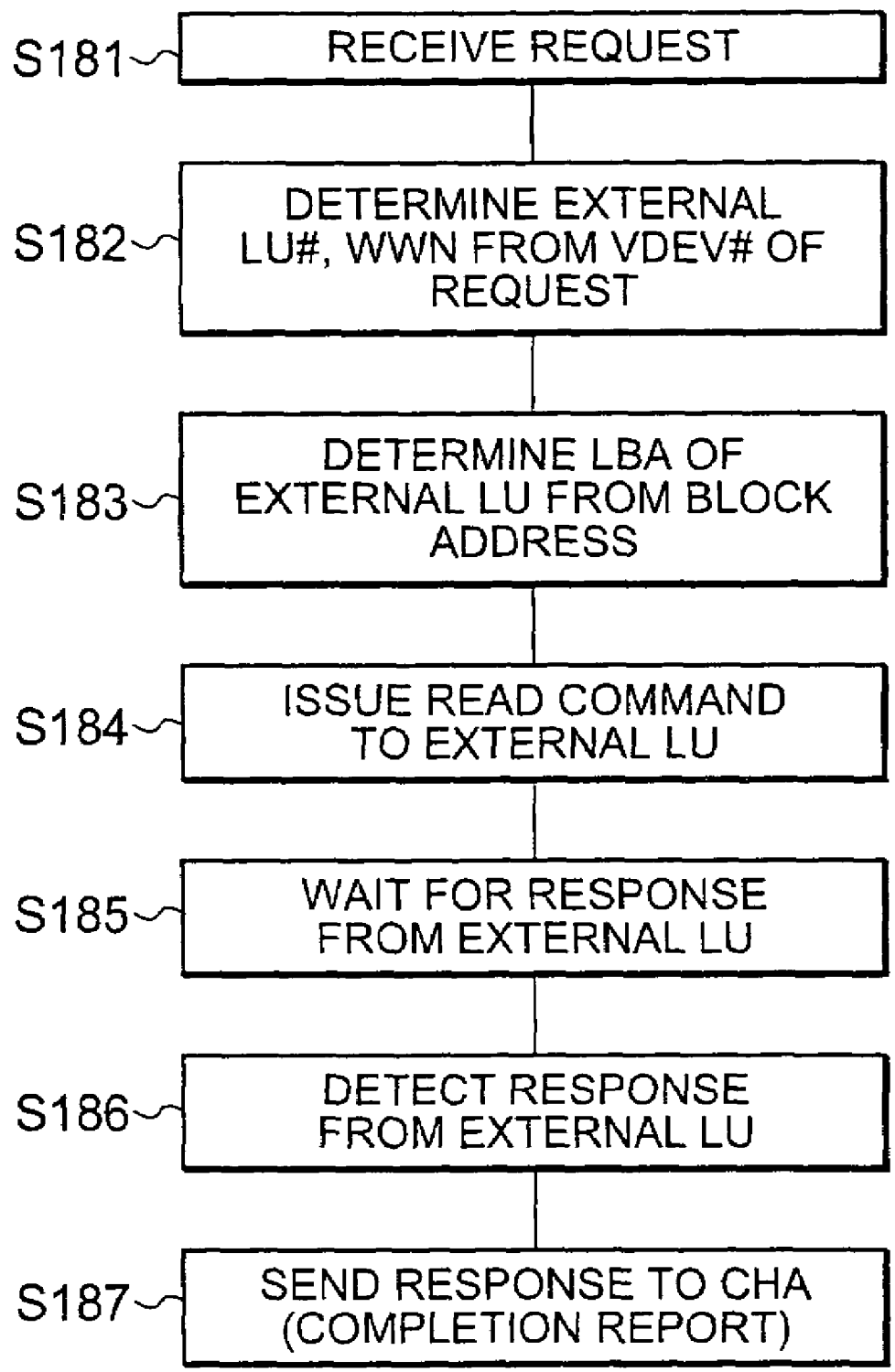
FIG. 24 is a flowchart showing the MP processing operation (read operation) of the CHF initiator I/F shown in FIG. 20.

FIG. 24 is a flowchart showing the processing operation (read operation) of the MP 133 of the CHF initiator I/F shown in FIG. 20.

In FIG. 24, when a request is received from the MF host (MF host 21 or similar) via the CHA 35 (step S181), the MP 133 of the CHF initiator I/F 37 uses the VDEV# comprised by the request and a VDEV information table such as for example that of FIG. 7 to determine the external LU# and WWN corresponding to the VDEV# (step S182). Next, using for example the conversion method shown in (b) of FIG. 13, the LBA of the external LU (for example the old-type storage device 23) is determined from the cache block address (step S183), and a read command is issued to the external LU determined in this way (step S184). After issuing the above read command, the MP 133 of the CHF initiator I/F 37 enters a wait state to wait for a response from the external storage device (for example the old-type storage device 23) having the above external LU (step S185).

When in this wait state a response from the external storage device (for example the old-type storage device 23) having the above external LU is detected (step S186), a report indicating completion of processing operation based on the above request (completion report) is transmitted as a response to the CHA 35 (step S187).

FIG. 25 is a block diagram showing an example of a backup method for an MF VOL comprised by an old-type storage device 23, comprised by the storage device system of an aspect of the invention.

In the backup method for the MF Vol 191 (of the old-type storage device 23) shown in FIG. 25, taking the MF Vol (LDEV) as an open-system Vol, backup is performed using the open-system Vol 193 which is an external Vol (seen from the old-type storage device 23). As explained above, by allocating an LDEV as a LUN to an open-system I/F port of a CHF PK or similar which is a P/K (package) having an open-system fiber I/F, reading and writing can be performed via the open-system I/F for all storage areas of the MF Vol 191, so that the MF Vol 191 can be backed up to the open-system Vol 193.

In the backup method shown in (a) of FIG. 25, backup of the MF Vol 191 is performed to the open-system Vol 193, which is an external Vol, via the open-system host 195. On the other hand, in the backup method shown in (b) of FIG. 25, backup of the MF Vol 191 is performed without passing through the open-system host 195. In the backup method shown in (b) of FIG. 25, backup of the MF Vol 191 is performed using an open-system Vol 199 of an external storage device 197 having initiator functions (able to issue an Open command) and an external tape device 201 having the same initiator functions.

Figure 26:
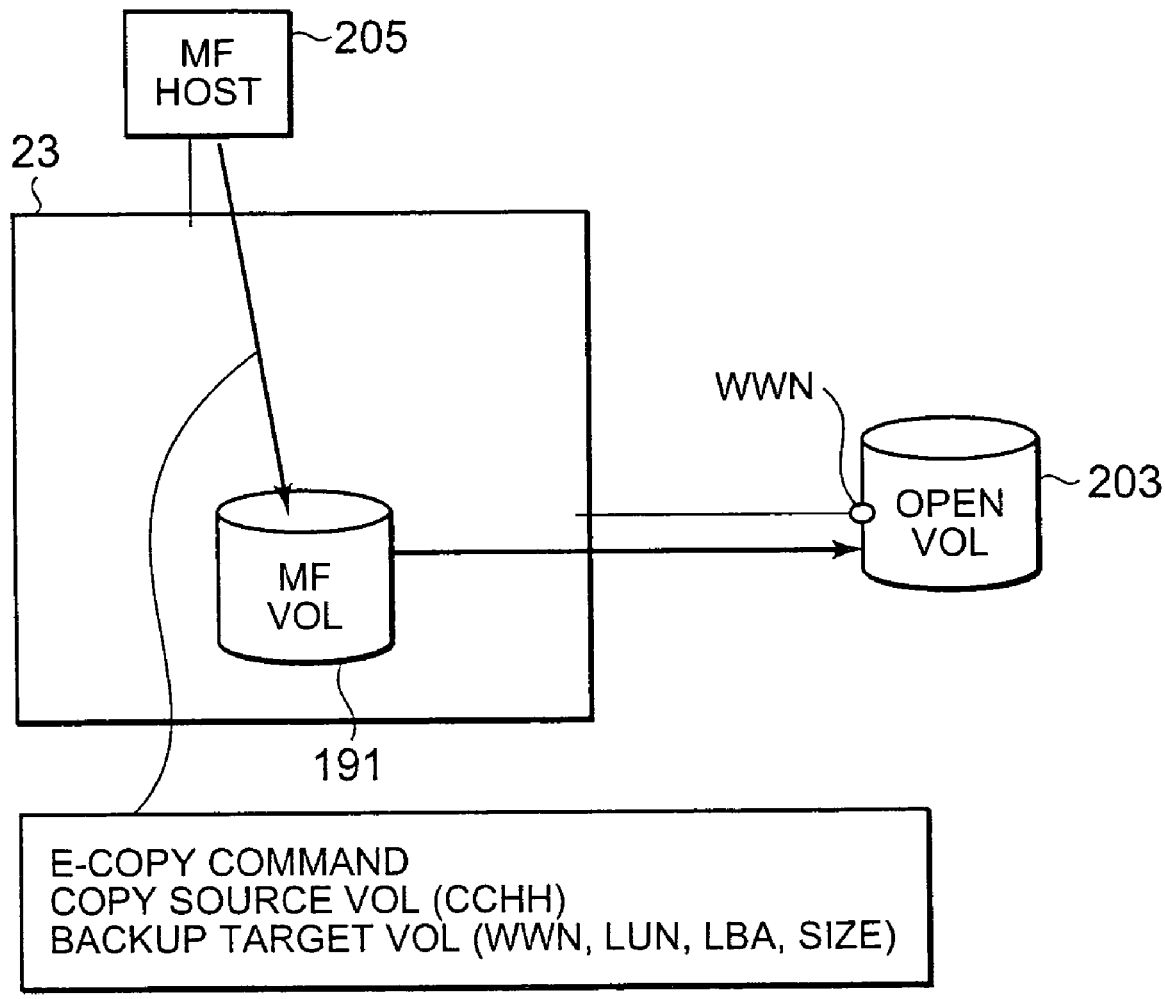

FIG. 26 is a block diagram showing another example of a backup method for an MF VOL comprised by an old-type storage device 23, comprised by the storage device system of an aspect of the invention.

In the method of backup of the MF Vol 191 (of the old-type storage device 23) shown in FIG. 26, similarly to the backup methods shown in FIG. 25, backup is performed using the an open-system Vol 203 having a WWN (World Wide Name) (path information), which is an external Vol (as seen from the old-type storage device 23), or an external tape device (not shown), with the MF Vol (LDEV) as an open-system Vol. When performing the backup, an E-Copy (Extended Copy) command (a command of the open system (SCSI3)) is transmitted from the MF host 205 to the old-type storage device 23, and by means of this E-Copy command, the MF Vol 191 is backed up using the open-system Vol 203 or an external tape device (not shown). Here, the E-Copy command comprises information (CCHH) to identify the MF Vol 191 which is the copy source Vol, and information (WWN, LUN, LBA, Size) to identify the open-system Vol 203 or similar which is the copy target (backup) Vol.

In the above, preferred aspects of the invention have been explained; however, these are examples used to explain the invention, and the scope of the invention is not limited to these examples. This invention can be implemented in various other modes.

What is claimed is:

1. A storage device system, comprising:
a storage device of a first standard, having a first mainframe volume; and
a storage device of a second standard different from said first standard, having a second mainframe volume,
wherein each said storage device of said first standard and said storage device of said second standard has an open-system interface device, which are connected with each other via a Fibre Channel (FC) cable,
wherein said first-standard storage device has:
a mapping portion which maps said first mainframe volume to said second mainframe volume such that a mainframe host connected to said second-standard storage device can access all the data stored in said first mainframe volume via said second mainframe volume; and
a virtual volume setting portion which sets a virtual volume of said first mainframe volume which can be identified as an open-system volume in which all storage areas of said first mainframe volume can be accessed, via said second mainframe volume, by an open-system host connected to said second-standard storage device.

2. The storage device system according to claim 1, wherein the attributes of said open-system interface on the side of said second-standard storage device are set as the initiator, and the attributes on the side of said first-standard storage device are set as the target.

3. The storage device system according to claim 1, wherein said first and second mainframe volumes are logical volumes, and said mapping portion issues a Read Capacity command, which is an open-system command, to said first-standard storage device, and performs said mapping by acquiring LUN information set in said open-system interface on the side of said first-standard storage device.

4. The storage device system according to claim 3, wherein said mapping portion sets the emulation type of said second mainframe volume in the mainframe volume at the time of said mapping.

5. The storage device system according to claim 1, wherein said second-standard storage device receives a CKD FORMAT command transmitted by said mainframe host at the time of said mapping, and performs data conversion of the command into the MF FORMAT of said first-standard storage device, as well as issuing a READ/WRITE command, which is a SCSI command, to said first-standard storage device.

6. The storage device system according to claim 1,
wherein said first and second mainframe volumes are logical volumes, and
said second-standard storage device has:
a VDEV information table having information related to a virtual volume of said first logical volume,
an LDEV information table having LDEV information referenced by the mainframe host regarding a virtual volume for which said mapping is performed, and
an LUN information volume table having, at least, information relating to said LDEV.

7. The storage device system according to claim 1, wherein, when a mainframe host accesses said first-standard storage device via said second-standard storage device, said first- and second-standard storage devices perform address conversion from cylinder numbers to block addresses in a cache.

8. The storage device system according to claim 1, wherein, when an open-system host accesses said first-standard storage device via said second-standard storage device, said first- and second-standard storage devices perform address conversion from LBAs to block addresses in a cache.

9. A storage device system, comprising:
a storage device of a first standard, having a first mainframe volume; and
a storage device of a second standard different from said first standard, having a second mainframe volume,
wherein each said storage device of said first standard and said storage device of said second standard has an open-system interface device, which are connected with each other via a Fibre Channel (FC) cable,
wherein said first-standard storage device has:
a mapping portion which maps said first mainframe volume to said second mainframe volume such that a mainframe host connected to said second-standard storage device can access all the data stored in said first mainframe volume via said second mainframe volume; and
a virtual volume setting portion which sets a virtual volume of said first mainframe volume which can be identified as an open-system volume for access, via said second mainframe volume by an open-system host connected to said second-standard storage device, of a user data storage area in said first mainframe volume, and
wherein, when it is judged that the host accessing said second-standard storage device is an open-system host, said first-standard storage device performs processing so as to expand said virtual volume to the same size as said first mainframe volume.

10. The storage device system according to claim 9, wherein, when said second-standard storage device is set as the initiator and said first-standard storage device is set as the target, said processing to expand the virtual volume is executed in a host mode in which special operations are performed according to the type of the host connected to said second-standard storage device.

* * * * *

UNITED STATES PATENT AND TRADEMARK OFFICE
CERTIFICATE OF CORRECTION

PATENT NO.        : 7,424,572 B2                                           Page 1 of 1
APPLICATION NO.   : 10/975817
DATED             : September 9, 2008
INVENTOR(S)       : Nakagawa et al.

It is certified that error appears in the above-identified patent and that said Letters Patent is hereby corrected as shown below:

On the title page:
Item (75), delete "Odawaram JP", and change to --Odawara (JP).--

Signed and Sealed this

Twenty-fourth Day of February, 2009

JOHN DOLL
*Acting Director of the United States Patent and Trademark Office*